(12) United States Patent
Poon et al.

(10) Patent No.: US 7,947,367 B2
(45) Date of Patent: *May 24, 2011

(54) FIBERS MADE FROM COPOLYMERS OF ETHYLENE/α-OLEFINS

(75) Inventors: Benjamin C. Poon, Pearland, TX (US); Yunwa W. Cheung, Lake Jackson, TX (US); Shih-Yaw Lai, Pearland, TX (US); Ashish Sen, Houston, TX (US); Hongyu Chen, Lake Jackson, TX (US); Yuen-Yuen D. Chiu, Pearland, TX (US); Rajen M. Patel, Lake Jackson, TX (US); Andy C. Chang, Houston, TX (US); Antonios K. Doufas, Pittsburgh, PA (US); Hong Peng, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 249 days.

This patent is subject to a terminal disclaimer.

(21) Appl. No.: 11/908,949

(22) PCT Filed: Mar. 15, 2006

(86) PCT No.: PCT/US2006/009851

§ 371 (c)(1),
(2), (4) Date: May 23, 2008

(87) PCT Pub. No.: WO2006/102149

PCT Pub. Date: Sep. 28, 2006

(65) Prior Publication Data

US 2009/0042472 A1 Feb. 12, 2009

(51) Int. Cl.
*B32B 27/00* (2006.01)
*D02G 3/00* (2006.01)

(52) U.S. Cl. .......... 428/394; 442/182; 442/329; 525/90; 526/348; 526/352.2; 526/943

(58) Field of Classification Search ....... 526/348–352.2, 526/943; 525/90; 442/182, 329; 428/394
See application file for complete search history.

(56) References Cited

U.S. PATENT DOCUMENTS

| | | | |
|---|---|---|---|
| 2,973,344 A | 2/1961 | Fasce | |
| 2,997,432 A | 8/1961 | Koble et al. | |
| 4,146,492 A | 3/1979 | Cusano et al. | |
| 4,299,931 A | 11/1981 | Coran et al. | |
| 4,429,079 A | 1/1984 | Shibata et al. | |
| 4,510,031 A | 4/1985 | Matsumura et al. | |
| 4,780,228 A | 10/1988 | Gardiner et al. | |
| 4,798,081 A | 1/1989 | Hazlitt et al. | |
| 5,068,047 A | 11/1991 | Chung et al. | |
| 5,266,626 A | 11/1993 | Hert et al. | |
| 5,322,728 A | 6/1994 | Davey et al. | |
| 5,391,629 A | 2/1995 | Turner et al. | |
| 5,597,881 A | 1/1997 | Winter et al. | |
| 5,624,991 A | 4/1997 | Harada et al. | |
| 5,668,235 A | 9/1997 | Winter et al. | |
| 5,741,858 A | 4/1998 | Brann et al. | |
| 5,763,032 A | 6/1998 | Hutt et al. | |
| 5,783,531 A | 7/1998 | Andrew et al. | |
| 5,868,984 A | 2/1999 | Winter et al. | |
| 5,892,076 A | 4/1999 | Nickias | |
| 5,916,953 A | 6/1999 | Jacoby et al. | |
| 5,994,255 A | 11/1999 | Nickias et al. | |
| 6,008,262 A | 12/1999 | McKay et al. | |
| 6,025,448 A | 2/2000 | Swindoll et al. | |
| 6,096,668 A | 8/2000 | Abuto et al. | |
| 6,121,402 A | 9/2000 | Machida et al. | |
| 6,136,937 A | 10/2000 | Lai et al. | |
| 6,147,180 A | 11/2000 | Markel et al. | |
| 6,160,029 A | 12/2000 | Chaudhary et al. | |
| 6,187,424 B1 | 2/2001 | Kjellqvist et al. | |
| 6,197,404 B1 | 3/2001 | Varona | |
| 6,323,284 B1 | 11/2001 | Peacock | |
| 6,362,252 B1 | 3/2002 | Prutkin | |
| 6,455,638 B2 | 9/2002 | Laughner et al. | |
| 6,537,472 B2 | 3/2003 | Masubichi | |
| 6,566,446 B1 | 5/2003 | Parikh et al. | |
| 6,815,023 B1 | 11/2004 | Tatarka et al. | |
| 7,005,395 B2 | 2/2006 | Zafiroglu et al. | |
| 7,355,089 B2 | 4/2008 | Chang et al. | |
| 7,504,347 B2 | 3/2009 | Poon et al. | |
| 7,514,517 B2 | 4/2009 | Hoenig et al. | |
| 7,524,911 B2 | 4/2009 | Karjala et al. | |
| 2003/0027954 A1 | 2/2003 | Becke et al. | |
| 2003/0088021 A1* | 5/2003 | Van Dun et al. ................ | 525/53 |
| 2003/0088037 A1 | 5/2003 | Stevens et al. | |
| 2003/0195128 A1 | 10/2003 | Deckman et al. | |
| 2003/0216518 A1 | 11/2003 | Tau et al. | |
| 2004/0082750 A1 | 4/2004 | Tau et al. | |
| 2004/0092662 A1 | 5/2004 | Goto et al. | |
| 2004/0158011 A1 | 8/2004 | Jain et al. | |
| 2004/0192147 A1 | 9/2004 | Smith et al. | |
| 2005/0009993 A1 | 1/2005 | Morioka et al. | |
| 2006/0030667 A1 | 2/2006 | Yalvac et al. | |
| 2006/0198983 A1 | 9/2006 | Patel et al. | |
| 2006/0199030 A1 | 9/2006 | Liang et al. | |
| 2006/0199744 A1 | 9/2006 | Walton et al. | |
| 2006/0199872 A1 | 9/2006 | Prieto et al. | |
| 2006/0199887 A1 | 9/2006 | Liang et al. | |
| 2006/0199896 A1 | 9/2006 | Walton et al. | |
| 2006/0199905 A1 | 9/2006 | Hughes et al. | |
| 2006/0199906 A1 | 9/2006 | Walton et al. | |

(Continued)

FOREIGN PATENT DOCUMENTS

EP 0 600 461 6/1994

(Continued)

*Primary Examiner* — Norca L Torres-Velazquez
(74) *Attorney, Agent, or Firm* — Whyte Hirschboeck Dudek SC

(57) ABSTRACT

A fiber is obtainable from or comprises an ethylene/α-olefin interpolymer characterized by an elastic recovery, Re, in percent at 300 percent strain and (1) cycle and a density, d, in grams/cubic centimeter, wherein the elastic recovery and the density satisfy the following relationship: Re>1481−1629(d). Such interpolymer can also be characterized by other properties. The fibers made therefrom have a relatively high elastic recovery and a relatively low coefficient of friction. The fibers can be cross-linked, if desired. Woven or non-woven fabrics can be made from such fibers.

22 Claims, 15 Drawing Sheets

U.S. PATENT DOCUMENTS

| | | |
|---|---|---|
| 2006/0199908 A1 | 9/2006 | Cheung et al. |
| 2006/0199910 A1 | 9/2006 | Walton et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Shan et al. |
| 2006/0199931 A1 | 9/2006 | Poon et al. |
| 2006/0205833 A1 | 9/2006 | Martinez et al. |
| 2006/0211819 A1 | 9/2006 | Hoenig et al. |
| 2007/0010616 A1 | 1/2007 | Kapur et al. |
| 2008/0299857 A1 | 12/2008 | Harding et al. |

FOREIGN PATENT DOCUMENTS

| | | |
|---|---|---|
| EP | 0 875 609 | 11/1998 |
| EP | 0 877 050 | 11/1998 |
| EP | 1 002 814 | 5/2000 |
| EP | 1 026 184 | 8/2000 |
| EP | 1 262 498 A2 | 12/2002 |
| JP | 09-208761 | 8/1997 |
| JP | 2004-204058 | 7/2004 |
| WO | WO 02/28965 | 4/2002 |
| WO | WO 02/079322 | 10/2002 |
| WO | WO 03/040442 | 5/2003 |
| WO | WO 2005/090425 | 9/2005 |
| WO | WO 2005/090426 | 9/2005 |
| WO | WO 2005/090426 A1 | 9/2005 |
| WO | WO 2005/090427 | 9/2005 |
| WO | WO 2005/090655 | 9/2005 |

\* cited by examiner

FIBERS MADE FROM COPOLYMERS OF ETHYLENE/α-OLEFINS

FIELD OF THE INVENTION

This invention relates to fibers made from ethylene/α-olefin copolymers and methods of making the fibers, and products made from the fibers.

BACKGROUND OF THE INVENTION

Fibers are typically classified according to their diameter. Monofilament fibers are generally defined as having an individual fiber diameter greater than about 15 denier, usually greater than about 30 denier per filament. Fine denier fibers generally refer to fibers having a diameter less than about 15 denier per filament. Microdenier fibers are generally defined as fibers having less than 100 microns in diameter. Fibers can also be classified by the process by which they are made, such as monofilament, continuous wound fine filament, staple or short cut fiber, spun bond, and melt blown fibers.

Fibers with excellent elasticity are needed to manufacture a variety of fabrics which are used, in turn, to manufacture a myriad of durable articles, such as sport apparel and furniture upholstery. Elasticity is a performance attribute, and it is one measure of the ability of a fabric to conform to the body of a wearer or to the frame of an item. Preferably, the fabric will maintain its conforming fit during repeated use, extensions and retractions at body and other elevated temperatures (such as those experienced during the washing and drying of the fabric).

Fibers are typically characterized as elastic if they have a high percent elastic recovery (that is, a low percent permanent set) after application of a biasing force. Ideally, elastic materials are characterized by a combination of three important properties: (i) a low percent permanent set, (ii) a low stress or load at strain, and (iii) a low percent stress or load relaxation. In other words, elastic materials are characterized as having the following properties (i) a low stress or load requirement to stretch the material, (ii) no or low relaxing of the stress or unloading once the material is stretched, and (iii) complete or high recovery to original dimensions after the stretching, biasing or straining is discontinued.

Spandex is a segmented polyurethane elastic material known to exhibit nearly ideal elastic properties. However, spandex is cost prohibitive for many applications. Also, spandex exhibits poor environmental resistance to ozone, chlorine and high temperature, especially in the presence of moisture. Such properties, particularly the lack of resistance to chlorine, causes spandex to pose distinct disadvantages in apparel applications, such as swimwear and in white garments that are desirably laundered in the presence of chlorine bleach.

A variety of fibers and fabrics have been made from thermoplastics, such as polypropylene, highly branched low density polyethylene (LDPE) made typically in a high pressure polymerization process, linear heterogeneously branched polyethylene (e.g., linear low density polyethylene made using Ziegler catalysis), blends of polypropylene and linear heterogeneously branched polyethylene, blends of linear heterogeneously branched polyethylene, and ethylene/vinyl alcohol copolymers.

In spite of the advances made in the art, there is a continuing need for polyolefin-based elastic fibers which are soft and yielding to body movement. Preferably, such fibers would have relatively high elastic recovery and could be made at a relatively high throughput. Moreover, it would be desirable to form fibers which do not require cumbersome processing steps but still provide soft, comfortable fabrics which are not tacky.

SUMMARY OF THE INVENTION

The aforementioned needs are met by various aspects of the invention. In one aspect, the invention relates to a fiber obtainable from or comprising at least one ethylene/α-olefin interpolymer, wherein the ethylene/α-olefin interpolymer is characterized by one or more of the following properties:

(a) having a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2;\text{ or}$$

(b) having a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48°\text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) having an elastic recovery, Re, in percent at 300 percent strain and 1 cycle measured with a compression-molded film of the interpolymer, and has a density, d, in grams/cubic centimeter, wherein the numerical values of Re and d satisfy the following relationship when the interpolymer is substantially free of a cross-linked phase:

$$Re > 1481 - 1629(d);\text{ or}$$

(d) having a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the interpolymer; or (e) having a storage modulus at 25° C., G'(25° C.), and a storage modulus at 100° C., G'(100° C.), wherein the ratio of G'(25° C.) to G'(100° C.) is from about 1:1 to about 10:1;

(f) having at least one molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (g) having an average block index greater than zero and up to about 1.0 and a molecular weight distribution, Mw/Mn, greater than about 1.3.

In another aspect, the invention relates to a fiber obtainable from or comprising at least one interpolymer of ethylene and $C_3$-$C_{20}$ α-olefin, wherein the interpolymer has a density from about 0.860 g/cc to about 0.895 g/cc and a compression set at 70° C. of less than about 70%. In some embodiments, the compression set at 70° C. is less than about 60%, less than about 50%, less than about 40%, or less than about 30%.

In some embodiments, the interpolymer satisfies the following relationship:

$$Re>1491-1629(d); \text{ or}$$

$$Re>1501-1629(d); \text{ or}$$

$$Re>1511-1629(d).$$

In other embodiments, the interpolymer has a melt index from about 0.1 to about 2000 g/10 minutes, from about 1 to about 1500 g/10 minutes, from about 2 to about 1000 g/10 minutes, from about 5 to about 500 g/10 minutes measured according to ASTM D-1238, Condition 190° C./2.16 kg. In some embodiments, the ethylene/α-olefin interpolymer has a $M_w/M_n$ from 1.7 to 3.5 and is a random block copolymer comprising at least a hard block and at least a soft block. Preferably, the ethylene/α-olefin interpolymer has a density in the range of about 0.86 to about 0.96 g/cc or about 0.86 to about 0.92 g/cc. In other embodiments, the ethylene/α-olefin interpolymer is blended with another polymer.

The term "α-olefin" in "ethylene/α-olefin interpolymer" or "ethylene/α-olefin/diene interpolymer" herein refers to $C_3$ and higher α-olefins. In some embodiments, the α-olefin is styrene, propylene, 1-butene, 1-hexene, 1-octene, 4-methyl-1-pentene, 1-decene, or a combination thereof and the diene is norbornene, 1,5-hexadiene, or a combination.

The fiber is elastic or inelastic. Sometimes, the fiber is cross-linked. The cross-linking can be effected by photon irradiation, electron beam irradiation, or a cross-linking agent. In some embodiments, the percent of cross-linked polymer is at least 20 percent, such as from about 20 percent to about 80 or from about 35 percent to about 50 percent, as measured by the weight percent of gels formed. Sometimes, the fiber is a bicomponent fiber. The bicomponent fiber has a sheath-core structure; a sea-island structure; a side-by-side structure; a matrix-fibril structure; or a segmented pie structure. The fiber can be a staple fiber or a binder fiber. In some embodiments, the fiber has coefficient of friction of less than about 1.2, wherein the interpolymer is not mixed with any filler.

In some embodiments, the fiber has a diameter in the range of about 0.1 denier to about 1000 denier and the interpolymer has a melt index from about 0.5 to about 2000 and a density from about 0.865 g/cc to about 0.955 g/cc. In other embodiments, the fiber has a diameter in the range of about 0.1 denier to about 1000 denier and the interpolymer has a melt index from about 1 to about 2000 and a density from about 0.865 g/cc to about 0.955 g/cc. In still other embodiments, the fiber has a diameter in the range of about 0.1 denier to about 1000 denier and the interpolymer has a melt index from about 3 to about 1000 and a density from about 0.865 g/cc to about 0.955 g/cc.

In yet another aspect, the invention relates to a fabric comprising the fibers made in accordance with various embodiments of the invention. The fabrics can be spunbond; melt blown; gel spun; solution spun; etc. The fabrics can be elastic or inelastic, woven or non-woven. In some embodiments, the fabrics have an MD percent recovery of at least 50 percent at 100 percent strain.

In still another aspect, the invention relates to a carded web or yarn comprising the fibers made in accordance with various embodiments of the invention. The yarn can be covered or not covered. When covered, it may be covered by cotton yarns or nylon yarns.

In yet still another aspect, the invention relates to a method of making the fibers. The method comprises (a) melting an ethylene/α-olefin interpolymer (as described herein); and extruding the ethylene/α-olefin interpolymer into a fiber. The fiber can be formed by melting spinning; spun bonding; melt blowing; etc. In some embodiments, the fabric formed form the fibers is substantially free of roping. Preferably, the fiber is drawn below the peaking melting temperature of the interpolymer.

Additional aspects of the invention and characteristics and properties of various embodiments of the invention become apparent with the following description.

for 1 day and b) storage at 40° C. for 12 hours. The unit for "unwind tension" is gram force.

Figure 12:
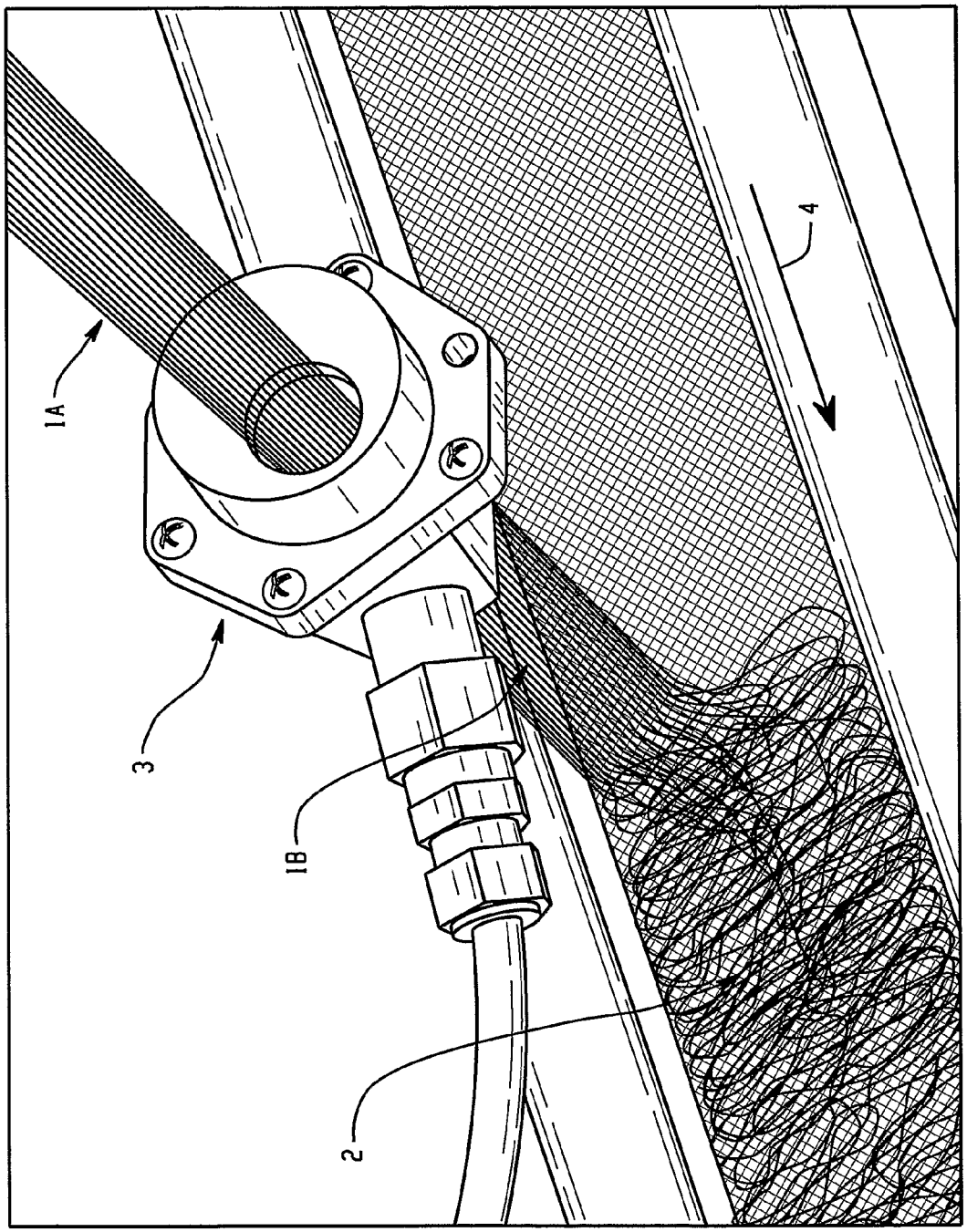

FIG. 12 is a schematic showing the set-up of aspirator/moving screen system used in some embodiments of the invention.

Figure 13C:
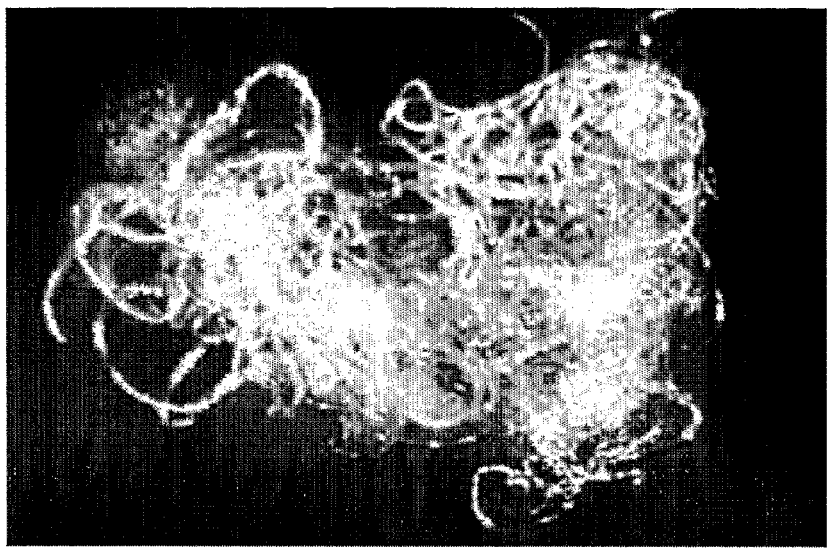
Figure 13B:
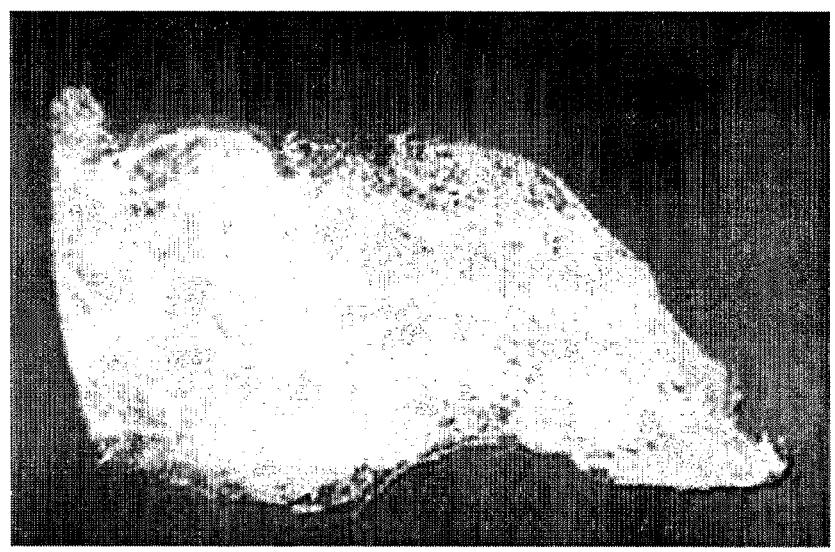
Figure 13A:
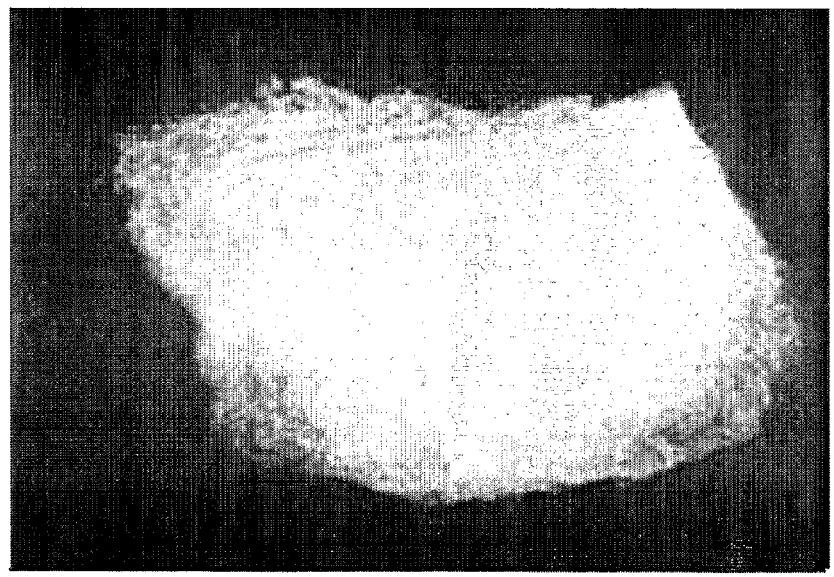

FIG. 13 is photos of various webs obtained in nonwoven examples. A is a photo showing the fabric made from Polymer Example 19I; B is a photo showing the fabric made from Polymer Example 19O; and C is a photo showing the fabric made from Polymer Example 19N.

Figure 14:
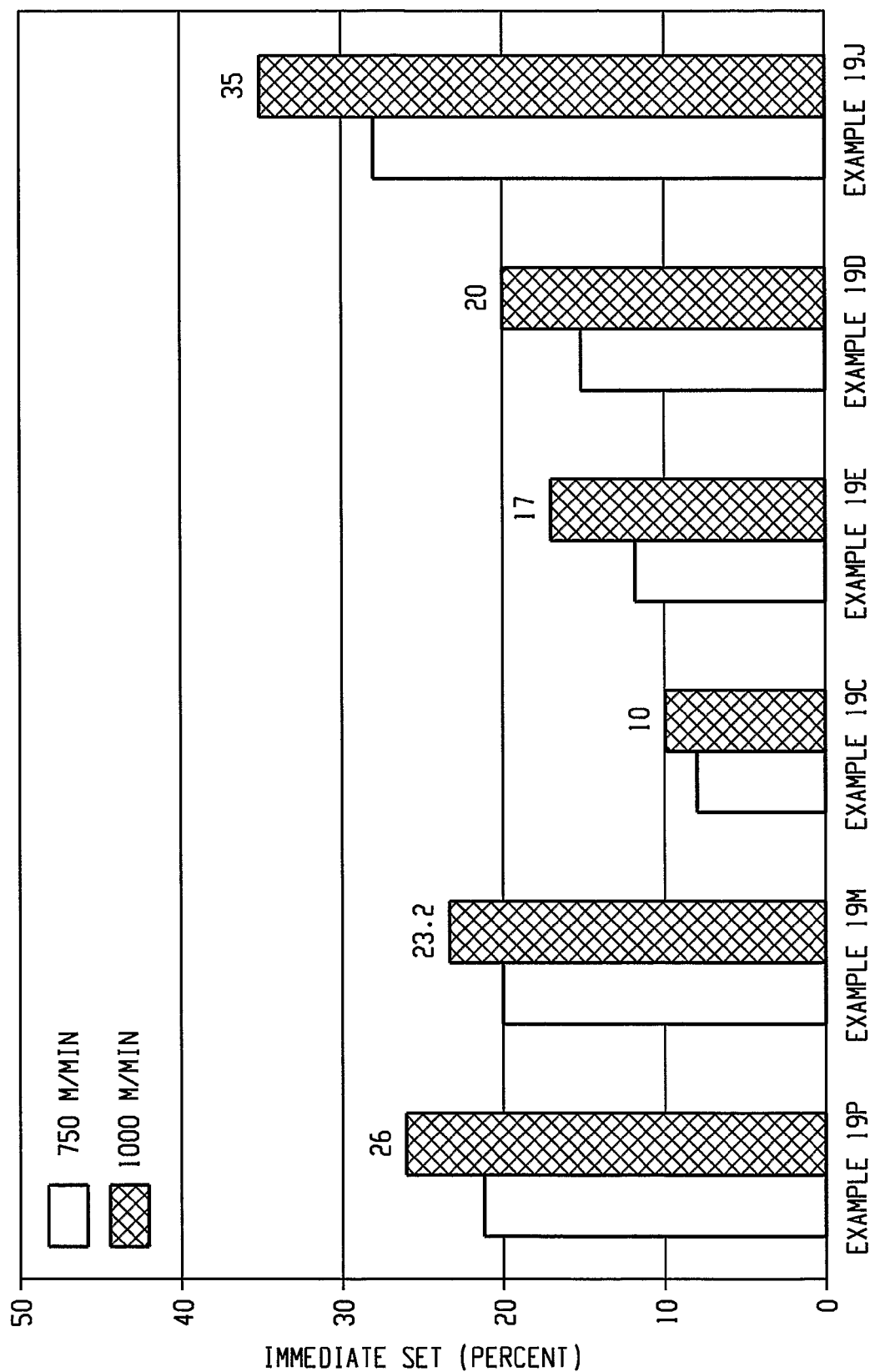

FIG. 14 shows immediate set for various fibers with hysteresis test at 100% strain.

Figure 15:
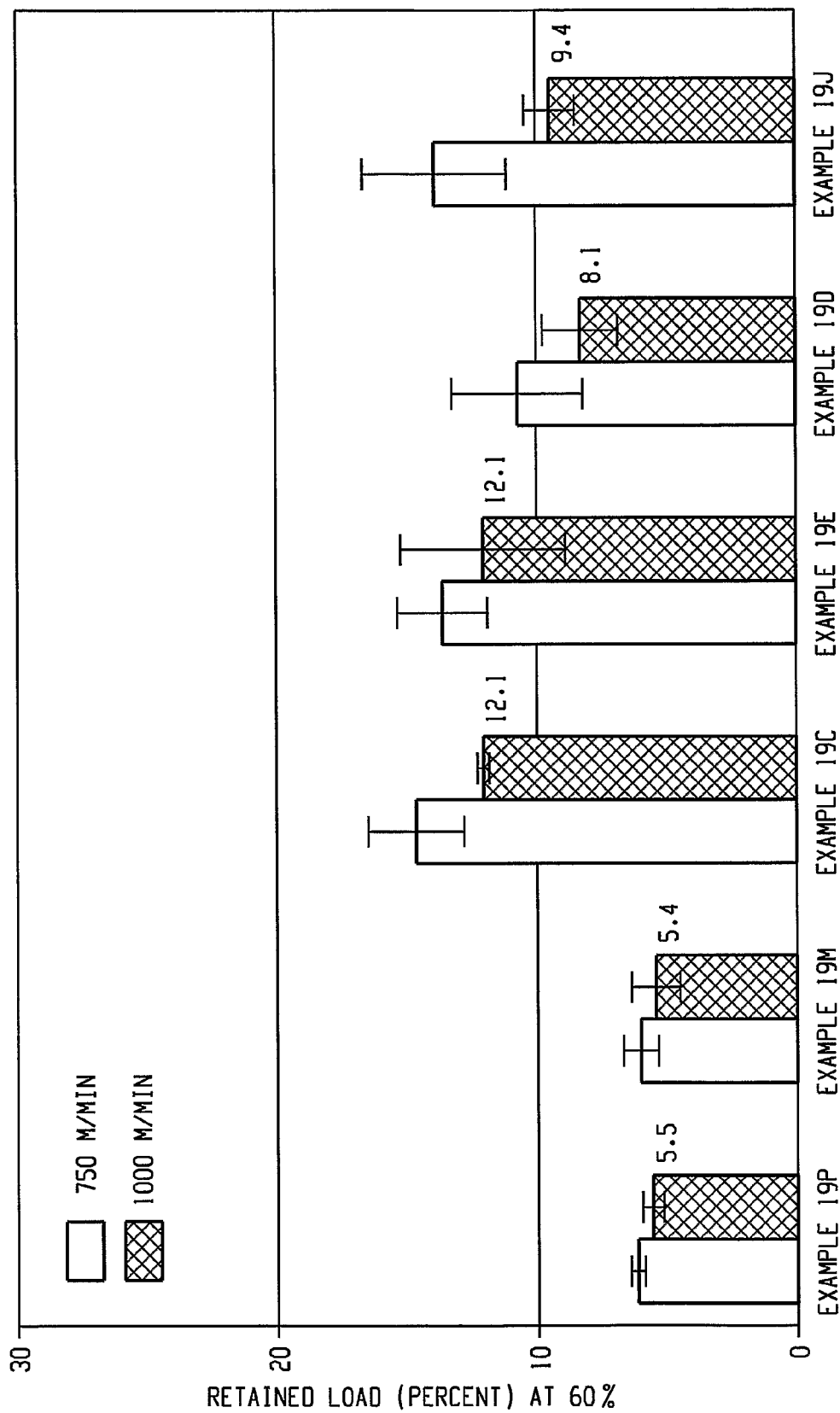

FIG. 15 shows retained load at 60% strain for various fibers with hysteresis test at 100% strain.

DETAILED DESCRIPTION OF THE INVENTION

General Definitions

"Fiber" means a material in which the length to diameter ratio is greater than about 10. Fiber is typically classified according to its diameter. Filament fiber is generally defined as having an individual fiber diameter greater than about 15 denier, usually greater than about 30 denier per filament. Fine denier fiber generally refers to a fiber having a diameter less than about 15 denier per filament. Microdenier fiber is generally defined as fiber having a diameter less than about 100 microns denier per filament.

"Filament fiber" or "monofilament fiber" means a continuous strand of material of indefinite (i.e., not predetermined) length, as opposed to a "staple fiber" which is a discontinuous strand of material of definite length (i.e., a strand which has been cut or otherwise divided into segments of a predetermined length).

"Elastic" means that a fiber will recover at least about 50 percent of its stretched length after the first pull and after the fourth to 100% strain (doubled the length). Elasticity can also be described by the "permanent set" of the fiber. Permanent set is the converse of elasticity. A fiber is stretched to a certain point and subsequently released to the original position before stretch, and then stretched again. The point at which the fiber begins to pull a load is designated as the percent permanent set. "Elastic materials" are also referred to in the art as "elastomers" and "elastomeric". Elastic material (sometimes referred to as an elastic article) includes the copolymer itself as well as, but not limited to, the copolymer in the form of a fiber, film, strip, tape, ribbon, sheet, coating, molding and the like. The preferred elastic material is fiber. The elastic material can be either cured or uncured, radiated or un-radiated, and/or crosslinked or uncrosslinked.

"Nonelastic material" means a material, e.g., a fiber, that is not elastic as defined above.

"Substantially crosslinked" and similar terms mean that the copolymer, shaped or in the form of an article, has xylene extractables of less than or equal to 70 weight percent (i.e., greater than or equal to 30 weight percent gel content), preferably less than or equal to 40 weight percent (i.e., greater than or equal to 60 weight percent gel content). Xylene extractables (and gel content) are determined in accordance with ASTM D-2765.

"Homofil fiber" means a fiber that has a single polymer region or domain, and that does not have any other distinct polymer regions (as do bicomponent fibers).

"Bicomponent fiber" means a fiber that has two or more distinct polymer regions or domains. Bicomponent fibers are also know as conjugated or multicomponent fibers. The polymers are usually different from each other although two or more components may comprise the same polymer. The polymers are arranged in substantially distinct zones across the cross-section of the bicomponent fiber, and usually extend continuously along the length of the bicomponent fiber. The configuration of a bicomponent fiber can be, for example, a sheath/core arrangement (in which one polymer is surrounded by another), a side by side arrangement, a pie arrangement or an "islands-in-the sea" arrangement. Bicomponent fibers are further described in U.S. Pat. Nos. 6,225,243, 6,140,442, 5,382,400, 5,336,552 and 5,108,820.

"Meltblown fibers" are fibers formed by extruding a molten thermoplastic polymer composition through a plurality of fine, usually circular, die capillaries as molten threads or filaments into converging high velocity gas streams (e.g. air) which function to attenuate the threads or filaments to reduced diameters. The filaments or threads are carried by the high velocity gas streams and deposited on a collecting surface to form a web of randomly dispersed fibers with average diameters generally smaller than 10 microns.

"Meltspun fibers" are fibers formed by melting at least one polymer and then drawing the fiber in the melt to a diameter (or other cross-section shape) less than the diameter (or other cross-section shape) of the die.

"Spunbond fibers" are fibers formed by extruding a molten thermoplastic polymer composition as filaments through a plurality of fine, usually circular, die capillaries of a spinneret. The diameter of the extruded filaments is rapidly reduced, and then the filaments are deposited onto a collecting surface to form a web of randomly dispersed fibers with average diameters generally between about 7 and about 30 microns.

"Nonwoven" means a web or fabric having a structure of individual fibers or threads which are randomly interlaid, but not in an identifiable manner as is the case of a knitted fabric. The elastic fiber in accordance with embodiments of the invention can be employed to prepare nonwoven structures as well as composite structures of elastic nonwoven fabric in combination with nonelastic materials.

"Yarn" means a continuous length of twisted or otherwise entangled filaments which can be used in the manufacture of woven or knitted fabrics and other articles. Yarn can be covered or uncovered. Covered yarn is yarn at least partially wrapped within an outer covering of another fiber or material, typically a natural fiber such as cotton or wool.

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and "copolymer" are used interchangeably herein. In some embodiments, the multi-block copolymer can be represented by the following formula:

$(AB)_n$ where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376,835 (insert when known), entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection to therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a particular reference is mentioned (e.g., a patent or journal article), it should be understood that such reference is incorporated by reference herein in its entirety, regardless of whether such wording is used in connection with it.

Embodiments of the invention provide fibers obtainable from or comprising a new ethylene/α-olefin interpolymer with unique properties and fabrics and other products made from such fibers. The fibers may have good abrasion resistance; low coefficient of friction; high upper service temperature; high recovery/retractive force; low stress relaxation (high and low temperatures); soft stretch; high elongation at break; inert: chemical resistance; and/or UV resistance. The fibers can be melt spun at a relatively high spin rate and lower temperature. In addition, the fibers are less sticky, resulting in better unwind performance and better shelf life, and the fabrics made from the fibers are substantially free of roping (i.e., fiber bundling). Because the fibers can be spun at a higher spin rate, the fibers' production throughput is high. Such fibers also have broad formation windows and broad processing windows.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in the cushioning net structures provided herein have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 + 13141(d) - 6720.3(d)^2, \text{ and more preferably}$$

$$T_m \geq 858.91 - 1825.3(d) + 1112.8(d)^2.$$

Figure 1:
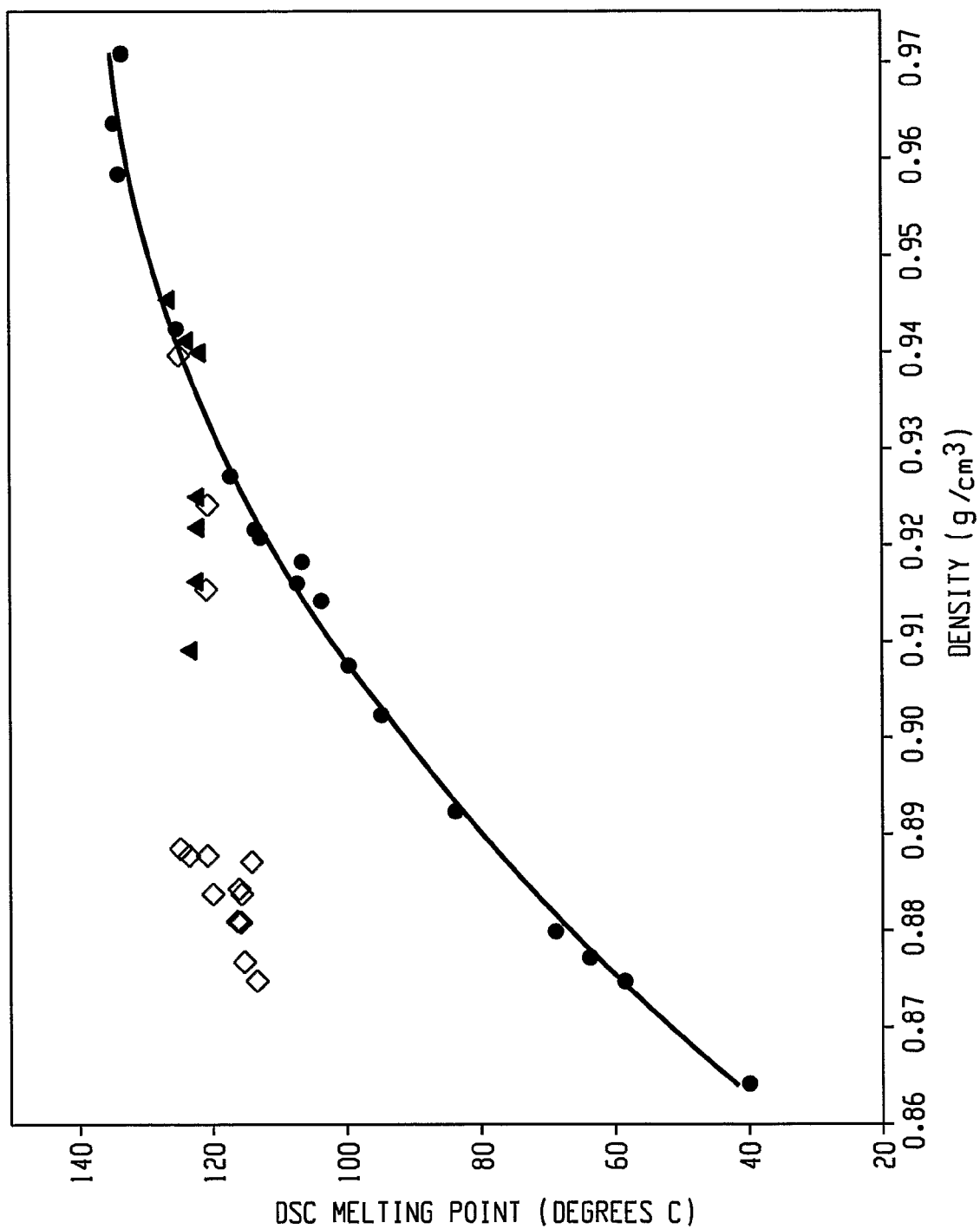
FIG. 1 shows the melting point/density relationship for the inventive polymers (represented by diamonds) as compared to traditional random copolymers (represented by circles) and Ziegler-Natta copolymers (represented by triangles).

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
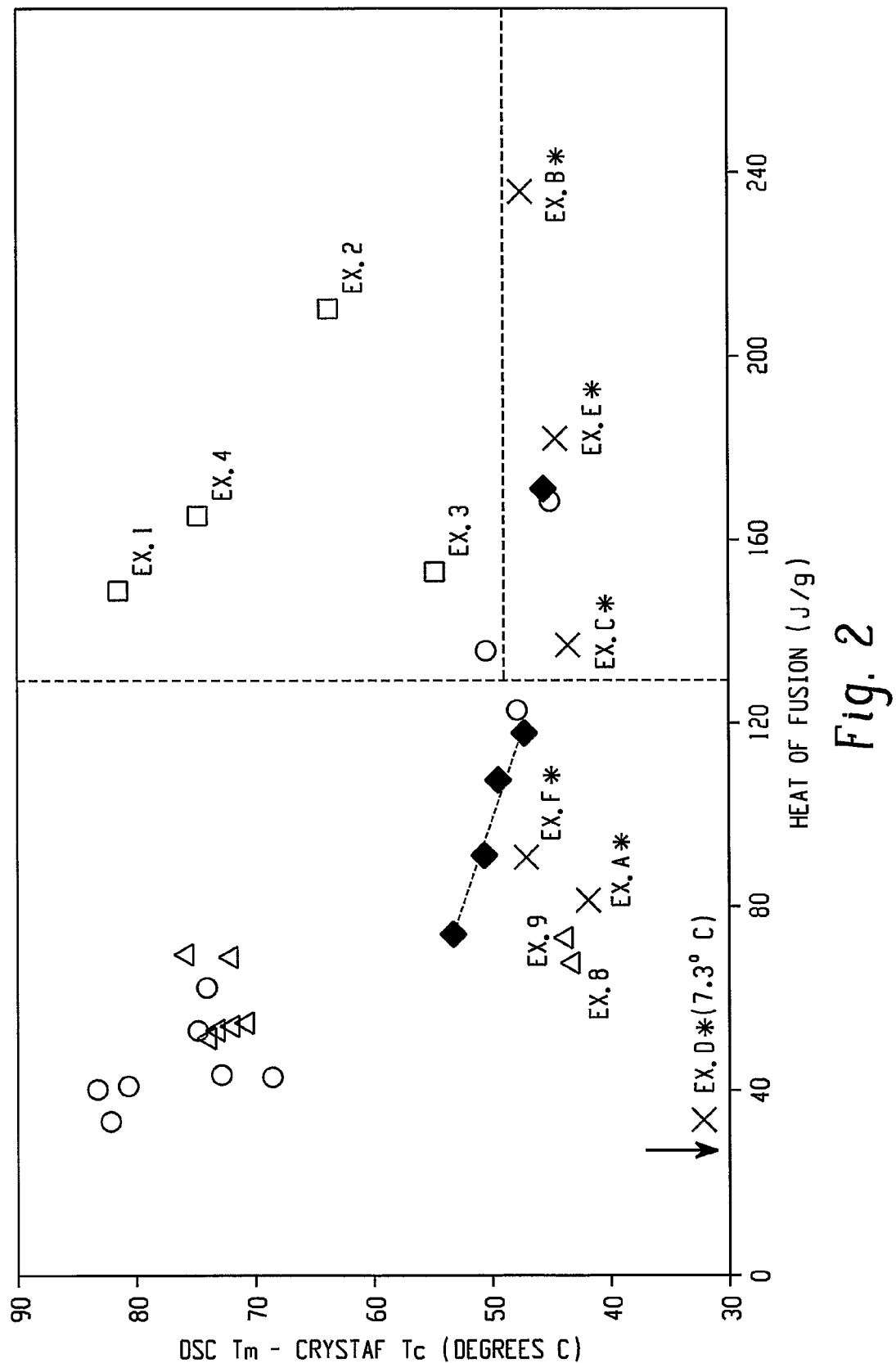
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=−0.1299 (ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ and preferably}$$

$$Re \geq 1491 - 1629(d); \text{ and more preferably}$$

$$Re \geq 11501 - 1629(d); \text{ and even more preferably}$$

$$Re \geq 1511 - 1629(d).$$

Figure 3:
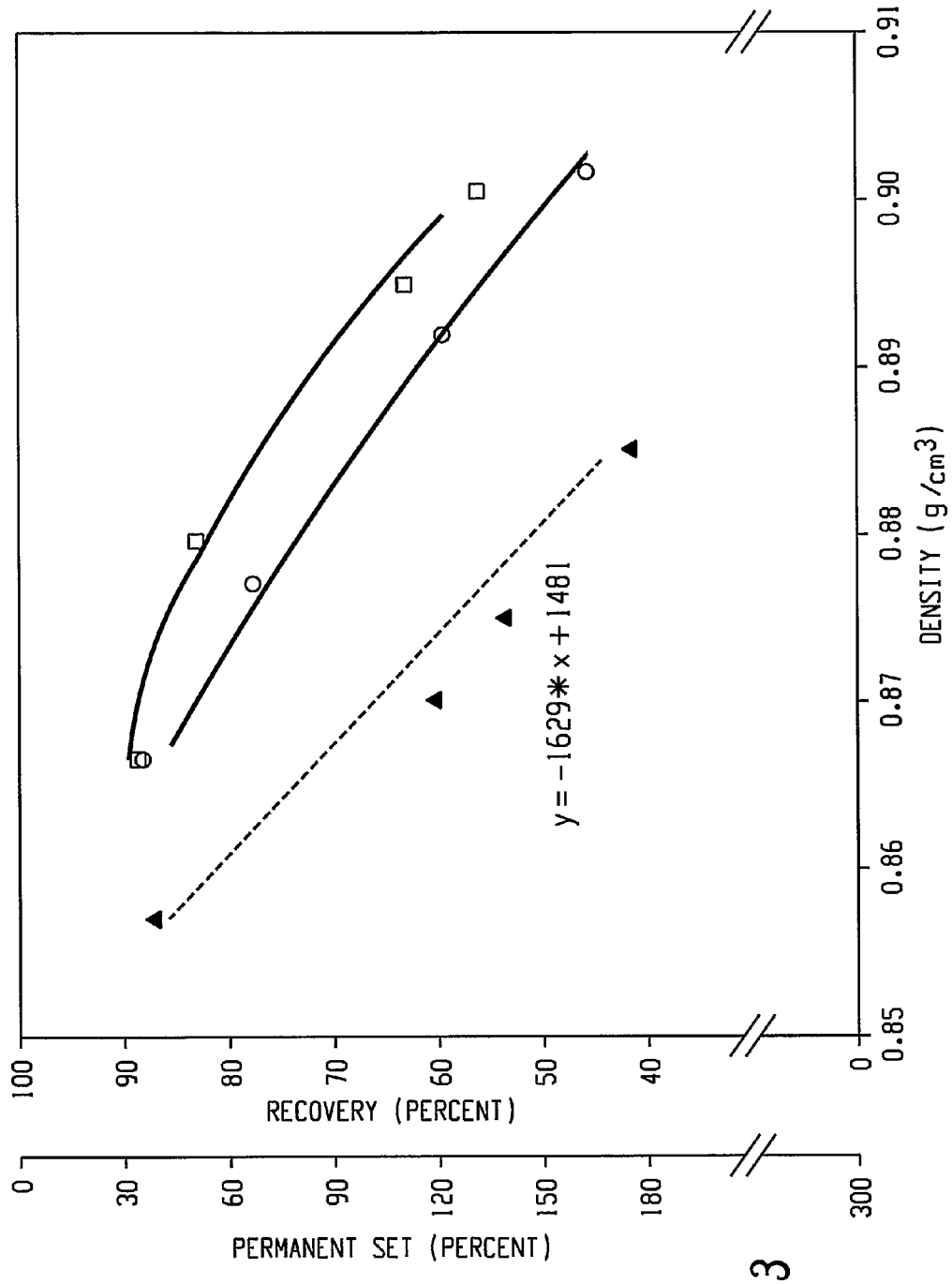
FIG. 3 shows the effect of density on elastic recovery for unoriented films made from inventive interpolymers (represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength ≧11 MPa, more preferably a tensile strength ≧13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 4:
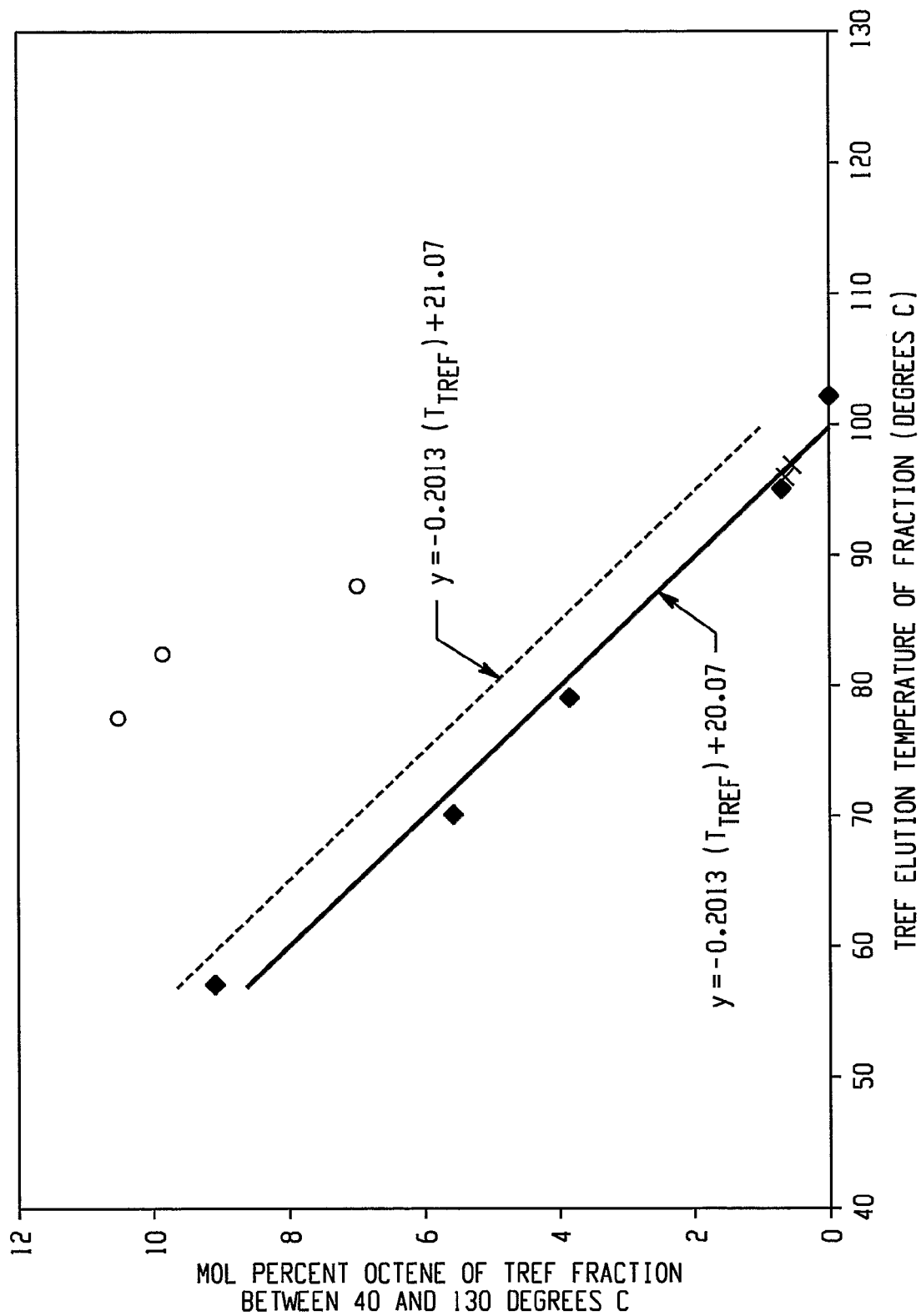
FIG. 4 is a plot of octene content of TREF fractionated ethylene/1-octene copolymer fractions versus TREF elution temperature of the fraction for the polymer of Example 5 (represented by the circles) and comparative polymers E and F (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several block ethylene/1-octene interpolymers of the invention (multi-block-copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
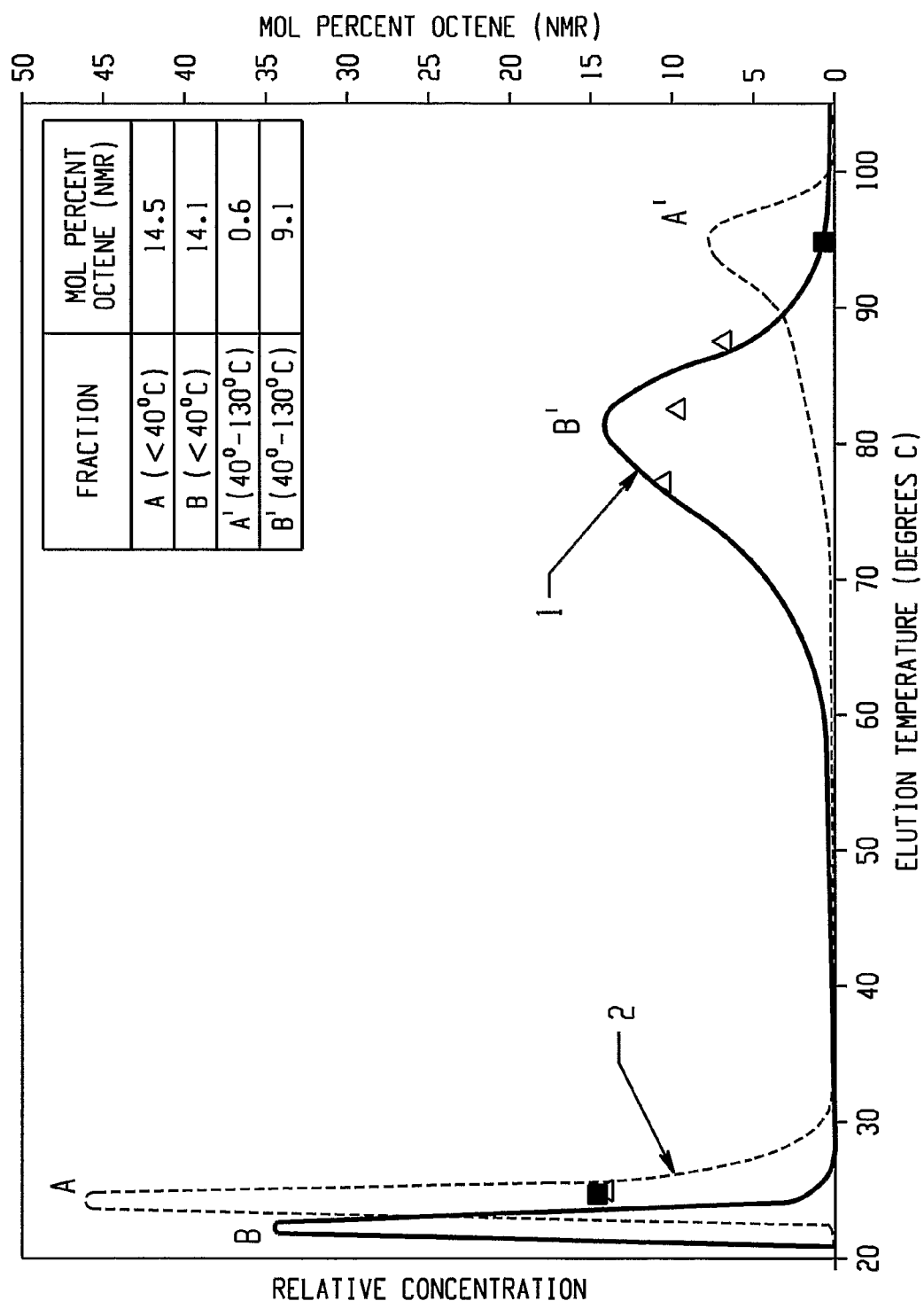
FIG. 5 is a plot of octene content of TREF fractionated ethylene/1-octene copolymer fractions versus TREF elution temperature of the fraction for the polymer of Example 5 (curve 1) and for comparative F (curve 2). The squares represent Example F*; and the triangles represent Example 5.

FIG. 5 graphically displays the TREF curve and comonomer contents of polymer fractions for Example 5 and comparative F to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one alpha-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.1356) T+13.89, more preferably greater than or equal to the quantity (−0.1356) T+14.93, and most preferably greater than or equal to the quantity (−0.2013)T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked intelpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction}) + 135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion}(J/gm) \leq (3.1718)(\text{ATREF elution temperature in Celsius}) - 136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion}(J/gm) \leq (1.1312)(\text{ATREF elution temperature in Celsius}) + 22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or}$$

$$BI = -\frac{LnP_X - LnP_{XO}}{LnP_A - LnP_{AB}}$$

where $T_X$ is the preparative ATREF elution temperature for the ith fraction (preferably expressed in Kelvin), $P_x$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K., $P_A$ is 1.

$T_{AB}$ is the ATREF temperature for a random copolymer of the same composition and having an ethylene mole fraction of $P_{AB}$. $T_{AB}$ can be calculated from the following equation:

$$Ln\, P_{AB} = \alpha/T_{AB} + \beta$$

where $\alpha$ and $\beta$ are two constants which can be determined by calibration using a number of known random ethylene copolymers. It should be noted that $\alpha$ and $\beta$ may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$LnP = -237.83/T_{ATREF} + 0.639$$

$T_{xo}$ is the ATREF temperature for a random copolymer of the same composition and having an ethylene mole fraction of $P_x$. $T_{xo}$ can be calculated from $LnP_x = \alpha/T_{xo} + \beta$. Conversely, $P_{xo}$ is the ethylene mole fraction for a random copolymer of the same composition and having an ATREF temperature of $T_x$, which can be calculated from $Ln\, P_{xo} = \alpha/T_x + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Figure 6:
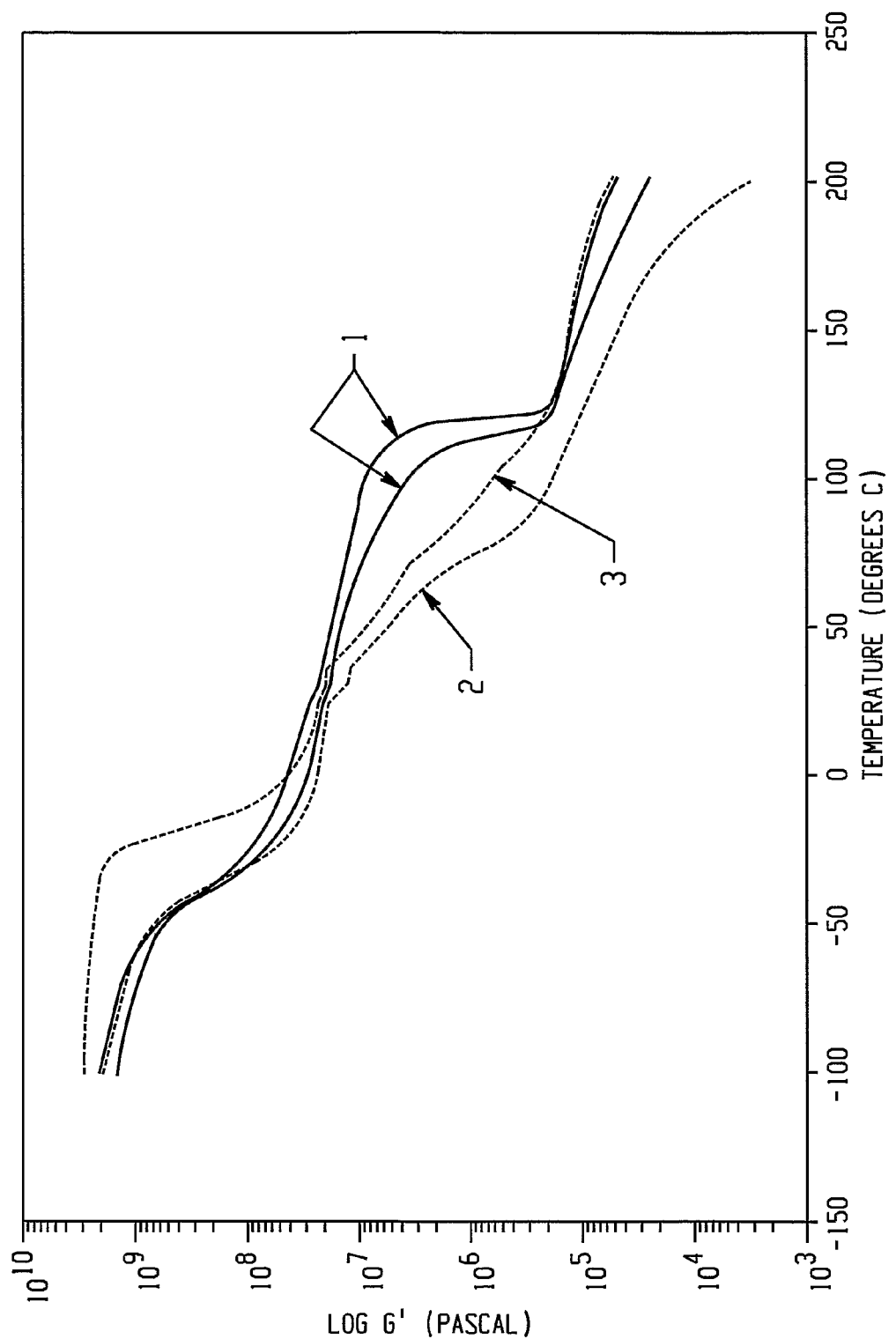
FIG. 6 is a graph of the log of storage modulus as a function of temperature for comparative ethylene/1-octene copolymer (curve 2) and propylene/ethylene-copolymer (curve 3) and for two ethylene/1-octene block copolymers of the invention made with differing quantities of chain shuttling agent (curves 1).

Further, the inventive polymers can have, alone or in combination with any other properties disclosed herein, a storage modulus, G', such that log(G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
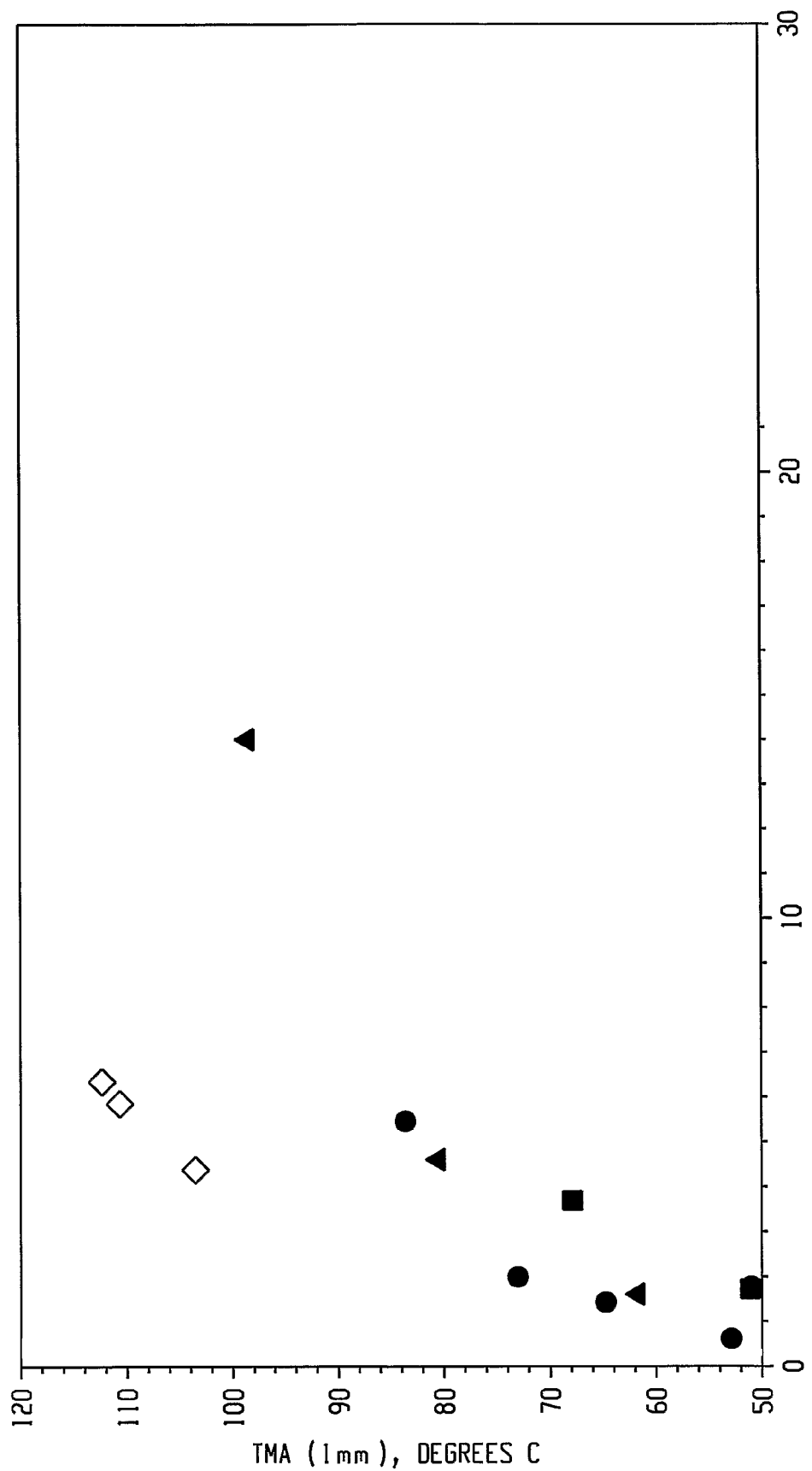
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/a-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/566,2938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method contains contacting ethylene and optionally one or more addition polymerizable monomers other than ethylene under addition polymerization conditions with a catalyst composition containing:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

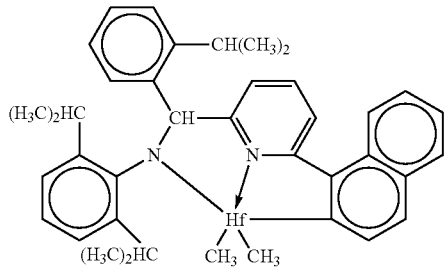

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

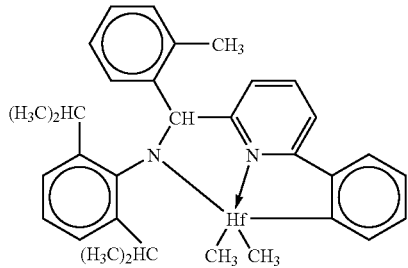

Catalyst (A3) is bis[N,N'''-(2,4,6-tri(methylphenyl)amido)ethylenediamine]hafnium dibenzyl.

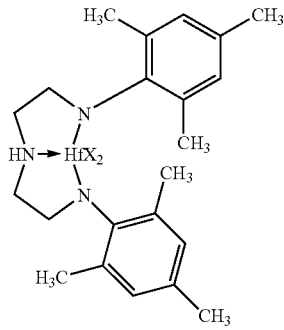

X = CH$_2$C$_6$H$_5$

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

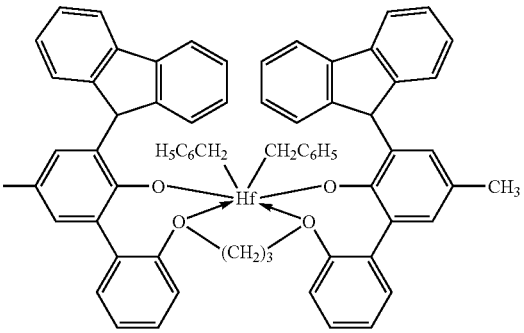

Catalyst (B1) is 1,2-bis-(3,5-di-t-butylphenylene)(1-(N-(1-methylethyl)immino)methyl)(2-oxoyl) zirconium dibenzyl

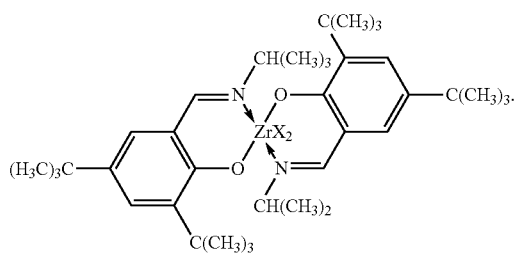

X = CH$_2$C$_6$H$_5$

Catalyst (B2) is 1,2-bis-(3,5-di-t-butylphenylene)(1-(N-(2-methylcyclohexyl)-immino)methyl)(2-oxoyl) zirconium dibenzyl

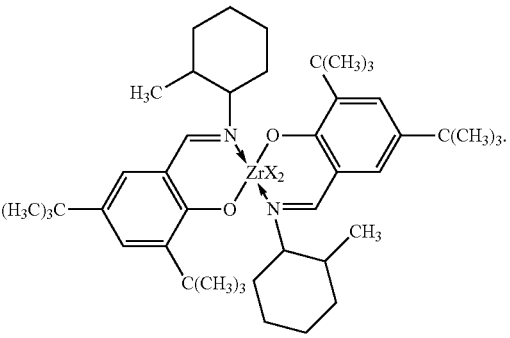

X = CH$_2$C$_6$H$_5$

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

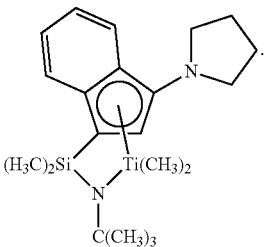

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

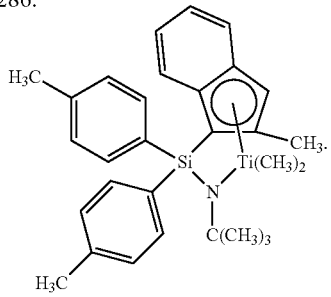

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

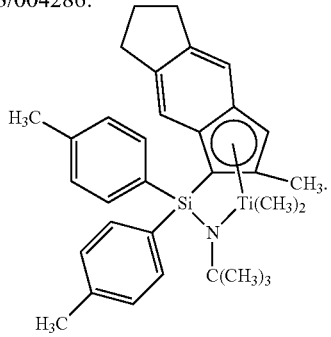

Catalyst (D1) is bis(dimethyldisiloxane)(indene-1-yl)zirconium dichloride available from Sigma-Aldrich:

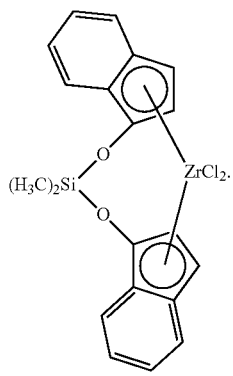

Shuttling Agents The shuttling agents employed include diethylzinc, di(1-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may contain alternating blocks of differing comonomer content (including homopolymer blocks). The inventive interpolymers may also contain a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness (i.e., the magnitude of the block index for a particular fraction or for the entire polymer). That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers containing monovinylidene aromatic monomers including styrene, o-methyl styrene, p-methyl styrene, t-butylstyrene, and the like. In particular, interpolymers containing ethylene and styrene can be prepared by following the teachings herein. Optionally, copolymers containing ethylene, styrene and a $C_3$-$C_{20}$ alpha olefin, optionally containing a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes containing from 4 to 20 carbons. Preferred dienes include 1,4-pentadiene, 1,4-hexadiene, 5-ethylidene-2-norbornene, dicyclopentadiene, cyclohexadiene, and 5-butyl-idene-2-norbornene. A particularly preferred diene is 5-ethylidene-2-norbornene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

The following examples are provided to illustrate the synthesis of the inventive polymers. Certain comparisons are made with some existing polymers.

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400–600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene} = 0.431(M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR100R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-N-(1-methylethyl)immino)methyl)(2-oxoyl) zirconium dibenzyl A solution of (1-methylethyl)(2-hydroxy-3,5-di(t-butyl) phenyl)imine (605 mg, 2.2 mmol) in 5 mL toluene is slowly added to a solution of Zr(CH$_2$Ph)$_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenol)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl) (2-oxoyl-3,5-di(t-butyl)phenyl) immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of Zr(CH$_2$Ph)$_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi (C$_{14-18}$alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B(C$_6$F$_5$)$_4$], substantially as disclosed in U.S. Pat. No. 5,919,9883, Ex. 2.

Cocatalyst 2 Mixed C$_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl) zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis (t-butyldimethylsiloxide) (SA14)i ethylaluminum di(bis (trimethylsilyl)amide) (SA15), ethylaluminum bis(2,3,6,7-dibenzo-1-azacycloheptaneamide) (SA 16), n-octylaluminum bis(2,3,6,7-dibenzo-1-azacycloheptaneamide) (SA17), n-octylaluminum bis(dimethyl(t-butyl)siloxide(SA18), ethylzinc (2,6-diphenylphenoxide) (SA19), and ethylzinc (t-butoxide) (SA20).

EXAMPLES 1-4, COMPARATIVE A-C

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 µL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers in according with some embodiments of the invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (µmol) | Cat (B1) (µmol) | Cocat (µmol) | MMAO (µmol) | shuttling agent (µmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |

TABLE 1-continued

| Ex. | Cat. (A1) (µmol) | Cat (B1) (µmol) | Cocat (µmol) | MMAO (µmol) | shuttling agent (µmol) | Yield (g) | Mn | Mw/Mn | hexyls[1] |
|---|---|---|---|---|---|---|---|---|---|
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution It may be seen the polymers produced according to certain embodiments of the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for comparative A shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for comparative B shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for comparative C shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

EXAMPLES 5-19, COMPARATIVES D-F

Continuous Solution Polymerization, Catalyst A1/B2+ DEZ

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T ° C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | [$C_2H_4$]/ [DEZ][4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |

TABLE 2-continued

Process details for preparation of exemplary polymers

| Ex. | C$_8$H$_{16}$ kg/hr | Solv. kg/hr | H$_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | [C$_2$H$_4$]/ [DEZ][4] | Poly Rate[5] kg/hr | Conv %[6] | Solids % | Eff.[7] |
|---|---|---|---|---|---|---|---|---|---|---|---|---|---|---|---|---|---|
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]molar ratio in reactor
[5]polymer production rate
[6]percent ethylene conversion in reactor
[7]efficiency, kg polymer/g M where g M = g Hf + g Zr

TABLE 3

Properties of exemplary polymers

| Ex. | Density (g/cm$^3$) | I$_2$ | I$_{10}$ | I$_{10}$/I$_2$ | Mw (g/mol) | Mn (g/mol) | Mw/Mn | Heat of Fusion (J/g) | T$_m$ (°C.) | T$_c$ (°C.) | T$_{CRYSTAF}$ (°C.) | Tm − T$_{CRYSTAF}$ (°C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of comparative D shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of comparative E shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of comparative F shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY®, available from The Dow Chemical Company), Comparative H* is an elastomeric, substantially linear ethylene/1-octene copolymer (AFFINITY®EG8100, available from The Dow Chemical Company), Comparative I is a substantially linear ethylene/1-octene copolymer (AFFINITY®PL1840, available from The Dow Chemical Company), Comparative J is a hydrogenated styrene/butadiene/styrene triblock copolymer (Kraton™ G1652, available from KRATON Polymers), Comparative K is a thermoplastic vulanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft² (kPa) | G'(25° C.)/ G'(100° C.) | 300% Strain Recovery (80° C.) (percent) | Compression Set (70° C.) (percent) |
| --- | --- | --- | --- | --- | --- |
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative J (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparatives F, G, H and J all have a 70° C. compression set of 100 percent (the maximum possible value, indicating no recovery). Good high temperature compression set (low numerical values) is especially needed for applications such as gaskets, window profiles, o-rings, and the like.

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm$^3$, preferably less than about 80 mm$^3$, and especially less than about 50 mm$^3$. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F, G and H have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative G. Lower stress relaxation means that the polymer retains its force better in applications such as diapers and other garments where retention of elastic properties over long time periods at body temperatures is desired.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm$^3$) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |

TABLE 6-continued

Polymer Optical Properties

| Ex. | Internal Haze (percent) | Clarity (percent) | 45° Gloss (percent) |
|---|---|---|---|
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative E are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

ADDITIONAL POLYMER EXAMPLES 19A-J

Continuous Solution Polymerization, Catalyst A1/B2+DEZ

For EXAMPLES 19A-I

Continuous solution polymerizations are carried out in a computer controlled well-mixed reactor. Purified mixed alkanes solvent (Isopar™ E available from ExxonMobil Chemical Company), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

For EXAMPLE 19J

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer.

Process details and results are contained in Table 8. Selected polymer properties are provided in Tables 9A-B.

In Table 9B, inventive examples 19F and 19G show low immediate set of around 65-70% strain after 500% elongation.

TABLE 8

Polymerization Conditions

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % | DEZ Flow lb/hr |
|---|---|---|---|---|---|---|---|---|---|---|---|
| 19A | 55.29 | 32.03 | 323.03 | 101 | 120 | 600 | 0.25 | 200 | 0.42 | 3.0 | 0.70 |
| 19B | 53.95 | 28.96 | 325.3 | 577 | 120 | 600 | 0.25 | 200 | 0.55 | 3.0 | 0.24 |
| 19C | 55.53 | 30.97 | 324.37 | 550 | 120 | 600 | 0.216 | 200 | 0.609 | 3.0 | 0.69 |
| 19D | 54.83 | 30.58 | 326.33 | 60 | 120 | 600 | 0.22 | 200 | 0.63 | 3.0 | 1.39 |
| 19E | 54.95 | 31.73 | 326.75 | 251 | 120 | 600 | 0.21 | 200 | 0.61 | 3.0 | 1.04 |
| 19F | 50.43 | 34.80 | 330.33 | 124 | 120 | 600 | 0.20 | 200 | 0.60 | 3.0 | 0.74 |
| 19G | 50.25 | 33.08 | 325.61 | 188 | 120 | 600 | 0.19 | 200 | 0.59 | 3.0 | 0.54 |
| 19H | 50.15 | 34.87 | 318.17 | 58 | 120 | 600 | 0.21 | 200 | 0.66 | 3.0 | 0.70 |
| 19I | 55.02 | 34.02 | 323.59 | 53 | 120 | 600 | 0.44 | 200 | 0.74 | 3.0 | 1.72 |
| 19J | 7.46 | 9.04 | 50.6 | 47 | 120 | 150 | 0.22 | 76.7 | 0.36 | 0.5 | 0.19 |

| Ex. | Cocat 1 Conc. ppm | Cocat 1 Flow lb/hr | Cocat 2 Conc. ppm | Cocat 2 Flow lb/hr | [Zn][4] in polymer ppm | Poly Rate[5] lb/hr | Conv[6] wt % | Polymer wt % | Eff.[7] |
|---|---|---|---|---|---|---|---|---|---|
| 19A | 4500 | 0.65 | 525 | 0.33 | 248 | 83.94 | 88.0 | 17.28 | 297 |
| 19B | 4500 | 0.63 | 525 | 0.11 | 90 | 80.72 | 88.1 | 17.2 | 257 |
| 19C | 4500 | 0.61 | 525 | 0.33 | 246 | 84.13 | 88.9 | 17.16 | 293 |
| 19D | 4500 | 0.66 | 525 | 0.66 | 491 | 82.56 | 88.1 | 17.07 | 280 |
| 19E | 4500 | 0.64 | 525 | 0.49 | 368 | 84.11 | 88.4 | 17.43 | 288 |
| 19F | 4500 | 0.52 | 525 | 0.35 | 257 | 85.31 | 87.5 | 17.09 | 319 |
| 19G | 4500 | 0.51 | 525 | 0.16 | 194 | 83.72 | 87.5 | 17.34 | 333 |
| 19H | 4500 | 0.52 | 525 | 0.70 | 259 | 83.21 | 88.0 | 17.46 | 312 |
| 19I | 4500 | 0.70 | 525 | 1.65 | 600 | 86.63 | 88.0 | 17.6 | 275 |
| 19J | — | — | — | — | — | — | — | — | — |

[1]standard $cm^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dimethyl
[4]ppm in final product calculated by mass balance
[5]polymer production rate
[6]weight percent ethylene conversion in reactor
[7]efficiency, kg polymer/g M where g M = g Hf + g Z

TABLE 9A

Polymer Physical Properties

| Ex. | Density (g/cc) | $I_2$ | $I_{10}$ | $I_{10}/I_2$ | Mw (g/mol) | Mn (g/mol) | Mw/Mn | Heat of Fusion (J/g) | Tm (° C.) | Tc (° C.) | TCRYSTAF (° C.) | Tm − TCRYSTAF (° C.) | CRYSTAF Peak Area (wt %) |
|---|---|---|---|---|---|---|---|---|---|---|---|---|---|
| 19A | 0.8781 | 0.9 | 6.4 | 6.9 | 123700 | 61000 | 2.0 | 56 | 119 | 97 | 46 | 73 | 40 |
| 19B | 0.8749 | 0.9 | 7.3 | 7.8 | 133000 | 44300 | 3.0 | 52 | 122 | 100 | 30 | 92 | 76 |

TABLE 9A-continued

Polymer Physical Properties

| Ex. | Density (g/cc) | $I_2$ | $I_{10}$ | $I_{10}/I_2$ | Mw (g/mol) | Mn (g/mol) | Mw/Mn | Heat of Fusion (J/g) | Tm (° C.) | Tc (° C.) | TCRYSTAF (° C.) | Tm − TCRYSTAF (° C.) | CRYSTAF Peak Area (wt %) |
|---|---|---|---|---|---|---|---|---|---|---|---|---|---|
| 19C | 0.8753 | 5.6 | 38.5 | 6.9 | 81700 | 37300 | 2.2 | 46 | 122 | 100 | 30 | 92 | 8 |
| 19D | 0.8770 | 4.7 | 31.5 | 6.7 | 80700 | 39700 | 2.0 | 52 | 119 | 97 | 48 | 72 | 5 |
| 19E | 0.8750 | 4.9 | 33.5 | 6.8 | 81800 | 41700 | 2.0 | 49 | 121 | 97 | 36 | 84 | 12 |
| 19F | 0.8652 | 1.1 | 7.5 | 6.8 | 124900 | 60700 | 2.1 | 27 | 119 | 88 | 30 | 89 | 89 |
| 19G | 0.8649 | 0.9 | 6.4 | 7.1 | 135000 | 64800 | 2.1 | 26 | 120 | 92 | 30 | 90 | 90 |
| 19H | 0.8654 | 1.0 | 7.0 | 7.1 | 131600 | 66900 | 2.0 | 26 | 118 | 88 | — | — | — |
| 19I | 0.8774 | 11.2 | 75.2 | 6.7 | 66400 | 33700 | 2.0 | 49 | 119 | 99 | 40 | 79 | 13 |
| 19J | 0.8995 | 5.6 | 39.4 | 7.0 | 75500 | 29900 | 2.5 | 101 | 122 | 106 | — | — | — |

TABLE 9B

Polymer Physical Properties of Compression Molded Films

| Example | Immediate Set after 100% Strain (%) | Immediate Set after 300% Strain (%) | Immediate Set after 500% Strain (%) | Recovery after 100% (%) | Recovery after 300% (%) | Recovery after 500% (%) |
|---|---|---|---|---|---|---|
| 19A | 15 | 63 | 131 | 85 | 79 | 74 |
| 19B | 14 | 49 | 97 | 86 | 84 | 81 |
| 19F | — | — | 70 | — | 87 | 86 |
| 19G | — | — | 66 | — | — | 87 |
| 19H | — | 39 | — | — | 87 | — |

TABLE 9C

Average Block Index For exemplary polymers[1]

| Example | $Zn/C_2{}^2$ | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1] Additional information regarding the calculation of the block indices for various polymers is disclosed in U.S. Patent Application Serial No. _____ (insert when known), entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclose of which is incorporated by reference herein in its entirety.
[2] $Zn/C_2 * 1000 = (Zn\ feed\ flow * Zn\ concentration/1000000/Mw\ of\ Zn)/(Total\ Ethylene\ feed\ flow * (1 - fractional\ ethylene\ conversion\ rate)/Mw\ of\ Ethylene) * 1000$. Please note that "Zn" in "Zn/$C_2$ * 1000" refers to the amount of zinc in diethyl zinc ("DEZ") used in the polymerization process, and "C2" refers to the amount of ethylene used in the polymerization process.

Fibers and Articles of Manufacture

Various homofil fibers can be made from the inventive block interpolymers (also referred to hereinafter as "copolymer(s)"), including staple fibers, spunbond fibers or melt blown fibers (using, e.g., systems as disclosed in U.S. Pat. Nos. 4,340,563, 4,663,220, 4,668,566 or 4,322,027, and gel spun fibers (e.g., the system disclosed in U.S. Pat. No. 4,413, 110). Staple fibers can be melt spun into the final fiber diameter directly without additional drawing, or they can be melt spun into a higher diameter and subsequently hot or cold drawn to the desired diameter using conventional fiber drawing techniques.

Bicomponent fibers can also be made from the block copolymers according to some embodiments of the invention. Such bicomponent fibers have the inventive block interpolymer in at least one portion of the fiber. For example, in a sheath/core bicomponent fiber (i.e., one in which the sheath concentrically surrounds the core), the inventive block inter polymer can be in either the sheath or the core. Typically and preferably, the copolymer is the sheath component of the bicomponent fiber but if it is the core component, then the sheath component must be such that it does not prevent the crosslinking of the core, i.e., the sheath component is transparent or translucent to UV-radiation such that sufficient UV-radiation can pass through it to substantially crosslink the core polymer. Different copolymers can also be used independently as the sheath and the core in the same fiber, preferably where both components are elastic and especially where the sheath component has a lower melting point than the core component. Other types of bicomponent fibers are within the scope of the invention as well, and include such structures as side-by-side conjugated fibers (e.g., fibers having separate regions of polymers, wherein the inventive block interpolymer comprises at least a portion of the fiber's surface).

The shape of the fiber is not limited. For example, typical fiber has a circular cross-sectional shape, but sometimes fibers have different shapes, such as a trilobal shape, or a flat (i.e., "ribbon" like) shape. The fiber disclosed herein is not limited by the shape of the fiber.

Fiber diameter can be measured and reported in a variety of fashions. Generally, fiber diameter is measured in denier per filament. Denier is a textile term which is defined as the grams of the fiber per 9000 meters of that fiber's length. Monofilament generally refers to an extruded strand having a denier per filament greater than 15, usually greater than 30. Fine denier fiber generally refers to fiber having a denier of about 15 or less. Microdenier (aka microfiber) generally refers to fiber having a diameter not greater than about 100 micrometers. For the fibers according to some embodiments of the invention, the diameter can be widely varied, with little impact upon the elasticity of the fiber. The fiber denier, however, can be adjusted to suit the capabilities of the finished article and as such, would preferably be: from about 0.5 to about 30 denier/filament for melt blown; from about 1 to about 30 denier/filament for spunbond; and from about 1 to about 20,000 denier/filament for continuous wound filament. Nonetheless, preferably, the denier is greater than 40, more preferably greater than or equal to 55 and most preferably greater than or equal to 65. These preferences are due to the fact that typically durable apparel employ fibers with deniers greater than about 40.

The elastic copolymer can also be shaped or fabricated into elastic films, coatings, sheets, strips, tapes, ribbons and the like. Such elastic film, coating and sheet may be fabricated by any method known in the art, including blown bubble processes (e.g., simple bubble as well as biaxial orientation techniques such trapped bubble, double bubble and tenter framing), cast extrusion, injection molding processes, thermoforming processes, extrusion coating processes, profile extrusion, and sheet extrusion processes. Simple blown bubble film processes are described, for example, in *The Encyclopedia of Chemical Technology*, Kirk-Othmer, Third Edition, John Wiley & Sons, New York, 1981, Vol. 16, pp. 416-417 and Vol. 18, pp. 191-192. The cast extrusion method is described, for example, in Modem Plastics Mid-October 1989 Encyclopedia Issue, Volume 66, Number 11, pages 256 to 257. Injection molding, thermoforming, extrusion coating, profile extrusion, and sheet extrusion processes are described, for example, in Plastics Materials and Processes, Seymour S. Schwartz and Sidney H. Goodman, Van Nostrand Reinhold Company, New York, 1982, pp. 527-563, pp. 632-647, and pp. 596-602.

The elastic strips, tapes and ribbons can be prepared by any known method, including the direct extrusion processing or by post-extrusion slitting, cutting or stamping techniques. Profile extrusion is an example of a primary extrusion process that is particularly suited to the preparation of tapes, bands, ribbons and the like.

The fibers according to embodiments of the invention can be used with other fibers such as PET, nylon, cotton, Kevlar™, etc. to make elastic fabrics. As an added advantage, the heat (and moisture) resistance of certain fibers can enable polyester PET fibers to be dyed at ordinary PET dyeing conditions. The other commonly used fibers, especially spandex (e.g., Lycra™), can only be used at less severe PET dyeing conditions to prevent degradation of properties.

Fabrics made from the fibers according to embodiments of the invention include woven, nonwoven and knit fabrics. Nonwoven fabrics can be made various by methods, e.g., spunlaced (or hydrodynamically entangled) fabrics as disclosed in U.S. Pat. Nos. 3,485,706 and 4,939,016, carding and thermally bonding staple fibers; spunbonding continuous fibers in one continuous operation; or by melt blowing fibers into fabric and subsequently calandering or thermally bonding the resultant web. These various nonwoven fabric manufacturing techniques are known to those skilled in the art and the disclosure is not limited to any particular method. Other structures made from such fibers are also included within the scope of the invention, including e.g., blends of these novel fibers with other fibers (e.g., poly(ethylene terephthalate) or cotton).

Nonwoven fabrics can be made from fibers obtained from solution spinning or flash spinning the inventive ethylene/α-olefin interpolmers. Solution spinning includes wet spinning and dry spinning. In both methods, a viscous solution of polymer is pumped through a filter and then passed through the fine holes of a spinnerette. The solvent is subsequently removed, leaving a fiber.

In some embodiments, the following process is used for flash spinning fibers and forming sheets from an inventive ethylene/α-olefin interpolmer. The basic system has been previously disclosed in U.S. Pat. Nos. 3,860,369 and 6,117,801, which are hereby incorporated by reference herein in its entirety. The process is conducted in a chamber, sometimes referred to as a spin cell, which has a vapor-removal port and an opening through which non-woven sheet material produced in the process is removed. Polymer solution (or spin liquid) is continuously or batchwise prepared at an elevated temperature and pressure and provided to the spin cell via a conduit. The pressure of the solution is greater than the cloud-point pressure which is the lowest pressure at which the polymer is fully dissolved in the spin agent forming a homogeneous single phase mixture.

The single phase polymer solution passes through a letdown orifice into a lower pressure (or letdown) chamber. In the lower pressure chamber, the solution separates into a two-phase liquid-liquid dispersion. One phase of the dispersion is a spin agent-rich phase which comprises primarily the spin agent and the other phase of the dispersion is a polymer-rich phase which contains most of the polymer. This two phase liquid-liquid dispersion is forced through a spinneret into an area of much lower pressure (preferably atmospheric pressure) where the spin agent evaporates very rapidly (flashes), and the polymer emerges from the spinneret as a yarn (or plexifilament). The yarn is stretched in a tunnel and is directed to impact a rotating baffle. The rotating baffle has a shape that transforms the yarn into a flat web, which is about 5-15 cm wide, and separating the fibrils to open up the web. The rotating baffle further imparts a back and forth oscillating motion having sufficient amplitude to generate a wide back and forth swath. The web is laid down on a moving wire lay-down belt located about 50 cm below the spinneret, and the back and forth oscillating motion is arranged to be generally across the belt to form a sheet.

As the web is deflected by the baffle on its way to the moving belt, it enters a corona charging zone between a stationary multi-needle ion gun and a grounded rotating target plate. The multi-needle ion gun is charged to a DC potential of by a suitable voltage source. The charged web is carried by a high velocity spin agent vapor stream through a diffuser comprising two parts: a front section and a back section. The diffuser controls the expansion of the web and slows it down. The back section of the diffuser may be stationary and separate from target plate, or it may be integral with it. In the case where the back section and the target plate are integral, they rotate together. Aspiration holes are drilled in the back section of the diffuser to assure adequate flow of gas between the moving web and the diffuser back section to prevent sticking of the moving web to the diffuser back section. The moving belt is grounded through rolls so that the charged web is electrostatically attracted to the belt and held in place thereon. Overlapping web swaths collected on the moving belt and held there by electrostatic forces are formed into a sheet with a thickness controlled by the belt speed. The sheet is compressed between the belt and the consolidation roll into a structure having sufficient strength to be handled outside the chamber and then collected outside the chamber on a windup roll.

Accordingly, some embodiments of the invention provide a soft polymeric flash-spun plexifilamentary material comprising an inventive ethylene/α-olefin interpolymer described herein. Preferably, the ethylene/α-olefin interpolymer has a melt index from about 0.1 to about 50 g/10 min or from about 0.4 to about 10 g/10 min and a density from about 0.85 to about 0.95 g/cc or from about 0.87 and about 0.90 g/cc. Preferably, the molecular weight distribution of the interpolymer is greater than about 1 but less than about four. Moreover, the flash-spun plexifilamentary material has a BET surface area of greater than about 2 m²/g or greater than about 8 m²/g. A soft flash-spun nonwoven sheet material can be made from the soft polymeric flash-spun plexifilamentary material. The soft flash-spun nonwoven sheet material can be spunbonded, area bonded, or pointed bonded. Other embodiments of the invention provide a soft polymeric flash-spun plexifilamentary material comprising an ethylene/α-alpha interpolymer (described herein) blended with high density polyethylene polymer, wherein the ethylene/α-alpha interpolymer has a melt index of between about 0.4 and about 10 g/10 min, a density between about 0.87 and about 0.93 g/cc, to and a molecular weight distribution less than about 4, and wherein the plexifilamentary material has a BET surface area greater than about 8 m²/g. The soft flash-spun nonwoven sheet has an opacity of at least 85%.

Flash-spun nonwoven sheets made by the above process or a similar process can used to replace Tyvek® spunbonded olefin sheets for air infiltration barriers in construction applications, as packaging such as air express envelopes, as medical packaging, as banners, and for protective apparel and other uses.

Fabricated articles which can be made using the fibers and fabrics according to embodiments of the invention include elastic composite articles (e.g., diapers) that have elastic portions. For example, elastic portions are typically constructed into diaper waist band portions to prevent the diaper from falling and leg band portions to prevent leakage (as shown in U.S. Pat. No. 4,381,781, the disclosure of which is incorporated herein by reference). Often, the elastic portions promote better form fitting and/or fastening systems for a good combination of comfort and reliability. The inventive fibers and fabrics can also produce structures which combine elasticity with breathability. For example, the inventive fibers, fabrics and/or films may be incorporated into the structures disclosed in U.S. provisional patent application 60/083,784, filed May 1, 1998. Laminates of non-wovens comprising fibers of the invention can also be formed and can be used in various articles, including consumer goods, such as durables and disposable consumers goods, like apparel, diapers, hospital gowns, hygiene applications, upholstery fabrics, etc.

The inventive fibers, films and fabrics can also be used in various structures as described in U.S. Pat. No. 2,957,512. For example, layer 50 of the structure described in the preceding patent (i.e., the elastic component) can be replaced with the inventive fibers and fabrics, especially where flat, pleated, creped, crimped, etc., nonelastic materials are made into elastic structures. Attachment of the inventive fibers and/or fabric to nonfibers, fabrics or other structures can be done by melt bonding or with adhesives. Gathered or shirted elastic structures can be produced from the inventive fibers and/or fabrics and nonelastic components by pleating the non-elastic component (as described in U.S. Pat. No. 2,957,512) prior to attachment, pre-stretching the elastic component prior to attachment, or heat shrinking the elastic component after attachment.

The inventive fibers also can be used in a spunlaced (or hydrodynamically entangled) process to make novel structures. For example, U.S. Pat. No. 4,801,482 discloses an elastic sheet (12) which can now be made with the novel fibers/films/fabric described herein.

Continuous elastic filaments as described herein can also be used in woven or knit applications where high resilience is desired.

U.S. Pat. No. 5,037,416 describes the advantages of a form fitting top sheet by using elastic ribbons (see member 19 of U.S. Pat. No. 5,037,416). The inventive fibers could serve the function of member 19 of U.S. Pat. No. 5,037,416, or could be used in fabric form to provide the desired elasticity.

In U.S. Pat. No. 4,981,747 (Morman), the inventive fibers and/or fabrics disclosed herein can be substituted for elastic sheet 122, which forms a composite elastic material including a reversibly necked material.

The inventive fibers can also be a melt blown elastic component, as described in reference 6 of the drawings of U.S. Pat. No. 4,879,170.

Elastic panels can also be made from the inventive fibers and fabrics disclosed herein, and can be used, for example, as members 18, 20, 14, and/or 26 of U.S. Pat. No. 4,940,464. The inventive fibers and fabrics described herein can also be used as elastic components of composite side panels (e.g., layer 86 of the patent).

The elastic materials can also be rendered pervious or "breathable" by any method known in the art including by apperturing, slitting, microperforating, mixing with fibers or foams, or the like and combinations thereof. Examples of such methods include, U.S. Pat. No. 3,156,242 by Crowe, Jr., U.S. Pat. No. 3,881,489 by Hartwell, U.S. Pat. No. 3,989,867 by Sisson and U.S. Pat. No. 5,085,654 by Buell.

The fibers in accordance with certain embodiments of the invention can include covered fibers. Covered fibers comprise a core and a cover. Generally, the core comprises one or more elastic fibers, and the cover comprises one or more inelastic fibers. At the time of the construction of the covered fiber and in their respective unstretched states, the cover is longer, typically significantly longer, than the core fiber. The cover surrounds the core in a conventional manner, typically in a spiral wrap configuration. Uncovered fibers are fibers without a cover. Generally, a braided fiber or yam, i.e., a fiber comprising two or more fiber strands or filaments (elastic and/or inelastic) of about equal length in their respective unstretched states intertwined with or twisted about one another, is not a covered fiber. These yarns can, however, be used as either or both the core and cover of the covered fiber. In other embodiments, covered fibers may comprise an elastic core wrapped in an elastic cover.

Full or substantial reversibility of heat-set stretch imparted to a fiber or fabric made from the fiber can be a useful property. For example, if a covered fiber can be heat-set before dyeing and/or weaving, then the dyeing and/or weaving processes are more efficient because the fiber is less likely to stretch during winding operations. This, in turn, can be useful in dyeing and weaving operations in which the fiber is first wound onto a spool. Once the dyeing and/or weaving is completed, then the covered fiber or fabric comprising the covered fiber can be relaxed. Not only does this technique reduce the amount of fiber necessary for a particular weaving operation, but it will also guard against subsequent shrinkage. Such reversible, heat-set, elastic fibers, and methods of making the fibers and articles made from such fibers are disclosed in U.S. patent application Ser. No. 10/507,230 (published as US 20050165193), which is incorporated by reference herein in its entirety. Such methods can also be used in embodiments of the invention with or without modifications to make reversible, heat-set, elastic fibers, fabrics, and articles made therefrom.

Preactivated articles can be made according to the teachings of U.S. Pat. Nos. 5,226,992, 4,981,747 (KCC, Morman), and U.S. Pat. No. 5,354,597, all of which are incorporated by reference herein in their entirety.

High tenacity fibers can be made according to the teachings of U.S. Pat. Nos. 6,113,656, 5,846,654, and 5,840,234, all of which are incorporated by reference herein in their entirety.

Low denier fibers, including microdenier fibers, can be made from the inventive interpolymers.

The preferred use of the inventive fibers, is in the formation of fabric, both woven and non-woven fabrics. Fabrics formed from the fibers have been found to have excellent elastic properties making them suitable for many garment applications. They also have good drapeability.

Some of the desirable properties of fibers and fabric may be expressed in terms of tensile modulus and permanent set. For a spunbonded fabric according to certain embodiments of the invention, the preferred properties which are obtained are as follows:

Tensile modulus (g) (ASTM-1682) (100% extension, 6 cycles, machine direction (MD)): preferably less than 900, more preferably less than 800, most preferably from 100 to 400; and/or Tensile modulus (g) (50% extension, 6 cycles, MD): preferably less than 700, more preferably less than 600, most preferably from 100 to 300; and/or Tensile modulus (g) (100% extension, 6 cycles, transverse direction (TD)): preferably less than 600, more preferably less than 500, most preferably from 50 to 300; and/or Tensile modulus (g) (50% extension, 6 cycles, TD): preferably less than 370, more preferably from 40 to 200; and/or Permanent set (%) (obtained through use of a modification of ASTM D-1682 wherein the stretching is cycled rather than continued through fabric failure) (50% extension, 6 cycles, MD): preferably less than 30, more preferably in the range of about 5-about 25%, most preferably less than 10-20; and/or Permanent set (%) (50% extension, 6 cycles, TD): preferably less than 35%, more preferably in the range of about 5-about 25%; and/or Permanent set (%) (100% extension, 6 cycles, MD): preferably less than 40%, more preferably in the range of about 5-about 35%, most preferably 8-20%; and/or Permanent set (%) (100% extension, 6 cycles, TD): preferably less than 40%, more preferably in the range of about 5-about 35%, most preferably in the range of about 5-25%; and/or Bond Temperature (° C.) less than 110, more preferably in the range of about 35-about 105, most preferably from 40-80. These properties are preferred and have utility for all fabrics of the invention, and are demonstrated, for example, by a fabric made from fibers according to certain embodiments of the invention and having a basis weight of about 70 to about 80 g/m², preferably about 70 g/m² and formed from fibers having diameter of about 25-28 .μm.

For meltblown fabric, according to certain embodiments of the invention, the preferred properties follow:

Permanent set (%) (50% extension, 6 cycles, MD): preferably less than 25, more preferably in the range of about 10-about 20, most preferably 15-18; and/or Permanent set (%) (50% extension, 6 cycles, TD): preferably less than about 25, more preferably in the range of about 10-about 20, most preferably 15-18; and/or Tensile modulus (g) (50% extension, 6 cycles, MD): preferably not more than about 300, more preferably in the range of about 200-about 300; and/or Tensile modulus (g) (50% extension, 6 cycles, TD): preferably less than about 300, more preferably in the range of about 50-about 150; about 150; and/or Total Hand (g): preferably less than about 75, more preferably less than about 70, most preferably in the range of about 10-about 20.

These properties are preferred and have utility for certain fabrics made in some embodiments of the invention, and are demonstrated, for example, by meltblown fabric with nominal basis weight of about 70 g/m², made from fibers of 8-10 μm diameter.

Blending with Another Polymer

The ethylene/α-olefin block interpolymers can be blended with at least another polymer make fibers, such as polyolefin (e.g., polypropylene). This second polymer is different from the/α-olefin block interpolymer in composition (comonomer type, comonomer content, etc.), structure, property, or a combination of both. For example, a block ethylene/octene copolymer is different than a random ethylene/octene copolymer, even if they have the same amount of comonomers. A block ethylene/octene copolymer is different than an ethylene/butane copolymer, regardless of whether it is a random or block copolymer or whether it has the same comonomer content. Two polymers also are considered different if they have a different molecular weight, even if they have the same structure and composition.

A polyolefin is a polymer derived from two or more olefins (i.e., alkenes). An olefin (i.e., alkene) is a hydrocarbon contains at least one carbon-carbon double bond. The olefin can be a monoene (i.e, an olefin having a single carbon-carbon double bond), diene (i.e, an olefin having two carbon-carbon double bonds), triene (i.e, an olefin having three carbon-carbon double bonds), tetraene (i.e, an olefin having four carbon-carbon double bonds), and other polyenes. The olefin or alkene, such as monoene, diene, triene, tetraene and other polyenes, can have 3 or more carbon atoms, 4 or more carbon atoms, 6 or more carbon atoms, 8 or more carbon atoms. In some embodiments, the olefin has from 3 to about 100 carbon atoms, from 4 to about 100 carbon atoms, from 6 to about 100 carbon atoms, from 8 to about 100 carbon atoms, from 3 to about 50 carbon atoms, from 3 to about 25 carbon atoms, from 4 to about 25 carbon atoms, from 6 to about 25 carbon atoms, from 8 to about 25 carbon atoms, or from 3 to about 10 carbon atoms. In some embodiments, the olefin is a linear or branched, cyclic or acyclic, monoene having from 2 to about 20 carbon atoms. In other embodiments, the alkene is a diene such as butadiene and 1,5-hexadiene. In further embodiments, at least one of the hydrogen atoms of the alkene is substituted with an alkyl or aryl. In particular embodiments, the alkene is ethylene, propylene, 1-butene, 1-hexene, 1-octene, 1-decene, 4-methyl-1-pentene, norbornene, 1-decene, butadiene, 1,5-hexadiene, styrene or a combination thereof.

The amount of the polyolefins in the polymer blend to make fibers can be from about 0.5 to about 99 wt %, from about 10 to about 90 wt %, from about 20 to about 80 wt %, from about 30 to about 70 wt %, from about 5 to about 50 wt %, from about 50 to about 95 wt %, from about 10 to about 50 wt %, or from about 50 to about 90 wt % of the total weight of the polymer blend.

Any polyolefin known to a person of ordinary skill in the art may be used to prepare the polymer blend disclosed herein. The polyolefins can be olefin homopolymers, olefin copolymers, olefin terpolymers, olefin quaterpolymers and the like, and combinations thereof.

In some embodiments, one of the at least two polyolefins is an olefin homopolymer. The olefin homopolymer can be derived from one olefin. Any olefin homopolymer known to a person of ordinary skill in the art may be used. Non-limiting examples of olefin homopolymers include polyethylene (e.g., ultralow, low, linear low, medium, high and ultrahigh density polyethylene), polypropylene, polybutylene (e.g., polybutene-1), polypentene-1, polyhexene-1, polyoctene-1, polydecene-1, poly-3-methylbutene-1, poly-4-methylpentene-1, polyisoprene, polybutadiene, poly-1,5-hexadiene.

In further embodiments, the olefin homopolymer is a polypropylene. Any polypropylene known to a person of ordinary skill in the art may be used to prepare the polymer blends disclosed herein. Non-limiting examples of polypropylene include polypropylene (LDPP), high density polypropylene (HDPP), high melt strength polypropylene (HMS-PP), high impact polypropylene (HIPP), isotactic polypropylene (iPP), syndiotactic polypropylene (sPP) and the like, and combinations thereof.

The amount of the polypropylene in the polymer blend can be from about 0.5 to about 99 wt %, from about 10 to about 90 wt %, from about 20 to about 80 wt %, from about 30 to about 70 wt %, from about 5 to about 50 wt %, from about 50 to about 95 wt %, from about 10 to about 50 wt %, or from about 50 to about 90 wt % of the total weight of the polymer blend.

Crosslinking

The fibers can be cross-linked by any means known in the art, including, but not limited to, electron-beam irradiation, beta irradiation, gamma irradiation, corona irradiation, silanes, peroxides, allyl compounds and UV radiation with or without crosslinking catalyst. U.S. Pat. Nos. 6,803,014 and 6,667,351 disclose electron-beam irradiation methods that can be used in embodiments of the invention.

Irradiation may be accomplished by the use of high energy, ionizing electrons, ultra violet rays, X-rays, gamma rays, beta particles and the like and combination thereof. Preferably, electrons are employed up to 70 megarads dosages. The irradiation source can be any electron beam generator operating in a range of about 150 kilovolts to about 6 megavolts with a power output capable of supplying the desired dosage. The voltage can be adjusted to appropriate levels which may be, for example, 100,000, 300,000, 1,000,000 or 2,000,000 or 3,000,000 or 6,000,000 or higher or lower. Many other apparati for irradiating polymeric materials are known in the art. The irradiation is usually carried out at a dosage between about 3 megarads to about 35 megarads, preferably between about 8 to about 20 megarads. Further, the irradiation can be carried out conveniently at room temperature, although higher and lower temperatures, for example 0° C. to about 60° C., may also be employed. Preferably, the irradiation is carried out after shaping or fabrication of the article. Also, in a preferred embodiment, the ethylene interpolymer which has been incorporated with a pro-rad additive is irradiated with electron beam radiation at about 8 to about 20 megarads.

Crosslinking can be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective. The catalyst (or mixture of catalysts) is present in a catalytic amount, typically between about 0.015 and about 0.035 phr.

Representative pro-rad additives include, but are not limited to, azo compounds, organic peroxides and polyfunctional vinyl or allyl compounds such as, for example, triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobisisobutyl nitrite and the like and combination thereof. Preferred pro-rad additives for use in some embodiments of the invention are compounds which have poly-functional (i.e. at least two) moieties such as C=C, C=N or C=O.

At least one pro-rad additive can be introduced to the ethylene interpolymer by any method known in the art. However, preferably the pro-rad additive(s) is introduced via a masterbatch concentrate comprising the same or different base resin as the ethylene interpolymer. Preferably, the pro-rad additive concentration for the masterbatch is relatively high e.g., about 25 weight percent (based on the total weight of the concentrate).

The at least one pro-rad additive is introduced to the ethylene polymer in any effective amount. Preferably, the at least one pro-rad additive introduction amount is from about 0.001 to about 5 weight percent, more preferably from about 0.005 to about 2.5 weight percent and most preferably from about 0.015 to about 1 weight percent (based on the total weight of the ethylene interpolymer.

In addition to electron-beam irradiation, crosslinking can also be effected by UV irradiation. U.S. Pat. No. 6,709,742 discloses a cross-linking method by UV irradiation which can be used in embodiments of the invention. The method comprises mixing a photoinitiator, with or without a photocrosslinker, with a polymer before, during, or after a fiber is formed and then exposing the fiber with the photoinitiator to sufficient UV radiation to crosslink the polymer to the desired level. The photoinitiators used in the practice of the invention are aromatic ketones, e.g., benzophenones or monoacetals of 1,2-diketones. The primary photoreaction of the monoacetals is the homolytic cleavage of the α-bond to give acyl and dialkoxyalkyl radicals. This type of α-cleavage is known as a Norrish Type I reaction which is more fully described in W. Horspool and D. Armesto, Organic Photochemistry: *A Comprehensive Treatment*, Ellis Horwood Limited, Chichester, England, 1992; J. Kopecky, *Organic Photochemistry: A Visual Approach*, VCH Publishers, Inc., New York, N.Y. 1992; N. J. Turro, et al., *Acc. Chem. Res.*, 1972, 5, 92; and J. T. Banks, et al., *J. Am. Chem. Soc.*, 1993, 115, 2473. The synthesis of monoacetals of aromatic 1,2 diketones, Ar—CO—C(OR)$_2$—Ar' is described in U.S. Pat. No. 4,190,602 and Ger. Offen. 2,337,813. The preferred compound from this class is 2,2-dimethoxy-2-phenylacetophenone, $C_6H_5$—CO—$C(OCH_3)_2$—$C_6H_5$, which is commercially available from Ciba-Geigy as Irgacure 651. Examples of other aromatic ketones useful as photoinitiators are Irgacure 184, 369, 819, 907 and 2959, all available from Ciba-Geigy.

In one embodiment of the invention, the photoinitiator is used in combination with a photocrosslinker. Any photocrosslinker that will upon the generation of free radicals, link two or more olefin polymer backbones together through the formation of covalent bonds with the backbones can be used. Preferably these photocrosslinkers are polyfunctional, i.e., they comprise two or more sites that upon activation will form a covalent bond with a site on the backbone of the copolymer. Representative photocrosslinkers include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate and the like. Preferred photocrosslinkers for use in some embodiments of the invention are compounds which have polyfunctional (i.e. at least two) moieties. Particularly preferred photocrosslinkers are triallycyanurate (TAC) and triallylisocyanurate (TAIC).

Certain compounds act as both a photoinitiator and a photocrosslinker. These compounds are characterized by the ability to generate two or more reactive species (e.g., free radicals, carbenes, nitrenes, etc.) upon exposure to UV-light and to subsequently covalently bond with two polymer chains. Any compound that can preform these two functions can be used in some embodiments of the invention, and representative compounds include the sulfonyl azides described in U.S. Pat. Nos. 6,211,302 and 6,284,842.

In another embodiment of this invention, the copolymer is subjected to secondary crosslinking, i.e., crosslinking other than and in addition to photocrosslinking. In this embodiment, the photoinitiator is used either in combination with a nonphotocrosslinker, e.g., a silane, or the copolymer is subjected to a secondary crosslinking procedure, e.g, exposure to E-beam radiation. Representative examples of silane crosslinkers are described in U.S. Pat. No. 5,824,718, and crosslinking through exposure to E-beam radiation is described in U.S. Pat. Nos. 5,525,257 and 5,324,576. The use of a photocrosslinker in this embodiment is optional.

At least one photoadditive, i.e., photoinitiator and optional photocrosslinker, can be introduced to the copolymer by any method known in the art. However, preferably the photoadditive(s) is (are) introduced via a masterbatch concentrate comprising the same or different base resin as the copolymer. Preferably, the photoadditive concentration for the masterbatch is relatively high e.g., about 25 weight percent (based on the total weight of the concentrate).

The at least one photoadditive is introduced to the copolymer in any effective amount. Preferably, the at least one photoadditive introduction amount is from about 0.001 to about 5, more preferably from about 0.005 to about 2.5 and most preferably from about 0.015 to about 1, wt % (based on the total weight of the copolymer).

The photoinitiator(s) and optional photocrosslinker(s) can be added during different stages of the fiber or film manufacturing process. If photoadditives can withstand the extrusion temperature, an olefin polymer resin can be mixed with additives before being fed into the extruder, e.g., via a masterbatch addition. Alternatively, additives can be introduced into the extruder just prior the slot die, but in this case the efficient mixing of components before extrusion is important. In another approach, olefin polymer fibers can be drawn without photoadditives, and a photoinitiator and/or photocrosslinker can be applied to the extruded fiber via a kiss-roll, spray, dipping into a solution with additives, or by using other industrial methods for post-treatment. The resulting fiber with photoadditive(s) is then cured via electromagnetic radiation in a continuous or batch process. The photo additives can be blended with an olefin polymer using conventional compounding equipment, including single and twin-screw extruders.

The power of the electromagnetic radiation and the irradiation time are chosen so as to allow efficient crosslinking without polymer degradation and/or dimensional defects. The preferred process is described in EP 0 490 854 B1. Photoadditive(s) with sufficient thermal stability is (are) premixed with an olefin polymer resin, extruded into a fiber, and irradiated in a continuous process using one energy source or several units linked in a series. There are several advantages to using a continuous process compared with a batch process to cure a fiber or sheet of a knitted fabric which are collected onto a spool.

Irradiation may be accomplished by the use of UV-radiation. Preferably, UV-radiation is employed up to the intensity of 100 $J/cm^2$. The irradiation source can be any UV-light generator operating in a range of about 50 watts to about 25000 watts with a power output capable of supplying the desired dosage. The wattage can be adjusted to appropriate levels which may be, for example, 1000 watts or 4800 watts or 6000 watts or higher or lower. Many other apparati for UV-irradiating polymeric materials are known in the art. The irradiation is usually carried out at a dosage between about 3 $J/cm^2$ to about 500 $J/scm^2$, preferably between about 5 $J/cm^2$ to about 100 $J/cm^2$. Further, the irradiation can be carried out conveniently at room temperature, although higher and lower temperatures, for example 0° C. to about 60° C., may also be employed. The photocrosslinking process is faster at higher temperatures. Preferably, the irradiation is carried out after shaping or fabrication of the article. In a preferred embodiment, the copolymer which has been incorporated with a photoadditive is irradiated with UV-radiation at about 10 $J/cm^2$ to about 50 $J/cm^2$.

Other Additives

Antioxidants, e.g., Irgafos 168, Irganox 1010, Irganox 3790, and chimassorb 944 made by Ciba Geigy Corp., may be added to the ethylene polymer to protect against undo degradation during shaping or fabrication operation and/or to better control the extent of grafting or crosslinking (i.e., inhibit excessive gelation). In-process additives, e.g. calcium stearate, water, fluoropolymers, etc., may also be used for purposes such as for the deactivation of residual catalyst and/or improved processability. Tinuvin 770 (from Ciba-Geigy) can be used as a light stabilizer.

The copolymer can be filled or unfilled. If filled, then the amount of filler present should not exceed an amount that would adversely affect either heat-resistance or elasticity at an elevated temperature. If present, typically the amount of filler is between 0.01 and 80 wt % based on the total weight of the copolymer (or if a blend of a copolymer and one or more other polymers, then the total weight of the blend). Representative fillers include kaolin clay, magnesium hydroxide, zinc oxide, silica and calcium carbonate. In a preferred embodiment, in which a filler is present, the filler is coated with a material that will prevent or retard any tendency that the filler might otherwise have to interfere with the crosslinking reactions. Stearic acid is illustrative of such a filler coating.

To reduced the friction coefficient of the fibers, various spin finish formulations can be used, such as metallic soaps dispersed in textile oils (see for example U.S. Pat. Nos. 3,039, 895 or 6,652,599), surfactants in a base oil (see for example US publication 2003/0024052) and polyalkylsiolxanes (see for example U.S. Pat. Nos. 3,296,063 or 4,999,120). U.S. patent application Ser. No. 10/933,721 (published as US20050142360) discloses spin finish compositions that can also be used.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

Fibers

Polymer samples from Example 11, Example 17 and Comparative G are spun into a multifilament bundle of 24 fibers with round cross-sections in a fiber spinning line (Fourne) equipped with twenty four 25×1 mm spinnerets a spin head temperature of 260° C., a melt temperature of 302° C. and a winder speed of 70 m/min. Other spinning conditions are listed in Table 10. The denier of the resulting bundle is approximately 95 to 100 denier (g/9000 m).

TABLE 10

| Pump Size (cm³/rev) | 1.12 |
| Pump Speed (rpm) | 10 |
| Screen Size, mesh (μm) | 325 (45) |
| Extruder Discharge Pressure (MPa) | 2 |

The fibers are crosslinked by passing six times through an electron beaming crosslinking machine operating at an electron beam dosage of 32 KGy/pass, giving a total dosage level of 192 KGy. Between each pass, the fibers are cooled to −10° C.

The tensile behavior of the resulting uncrosslinked and crosslinked fibers is measured according to BISFA Test Methods for Bare Elastic Yarns, Chapter 6: Tensile Properties using Option C clamps and Option A test speed. Tenacity and elongation at break are reported from an average of 5 replications. The recovery behavior of the crosslinked fibers is also measured using BISFA Test Methods for Bare Elastic Yarns, Chapter 7: Viscoelastic Properties Procedure A where the fiber is cyclically loaded to 300 percent strain. The percent permanent deformation is calculated at the beginning of the 6$^{th}$ cycle as specified in the test method.

Stress relaxation of crosslinked fibers is measured from 10 percent strain at alternating temperatures of 21° C. and 40° C. In the experiment, 13 loops of the bundle fibers with a circumference of 324 mm are mounted to an Instron test machine by 2 hooks resulting in a gauge length of 162 mm. The sample is stretched to 10 percent strain at a rate of 100 percent elongation/minute at 21° C. and then held for 10 minutes. The subsequent thermal treatment is: 10 minutes at 40° C. in a water bath, 10 minutes at 21° C. in air, 10 minutes at 40° C. in a water bath, and 10 minutes at 21° C. in air. The time to transfer the sample between the water bath and the air cooling chamber is 6 seconds. During the entire process, the load is monitored. The percent load change from the load at 35 minutes and the load at 45 minutes is calculated using the formula:

$$\% \text{ load change} = \frac{L(t = 35 \text{ min}) - L(t = 45 \text{ min})}{L(t = 35 \text{ min})}$$

where L(t=35 min) and L(t=45 min) are loads at 35 minutes and 45 minutes, corresponding to the middle periods of the last 40° C. water bath and 21° C. air exposures, respectively. Fiber properties are also tabulated in Table 11.

TABLE 11

| | Fiber Properties | | | | | |
|---|---|---|---|---|---|---|
| | Uncrosslinked | | Crosslinked | | | |
| | | | | | Permanent | |
| Ex. | Tenacity (gf/denier) | Elongation at Break (percent) | Tenacity (gf/denier) | Elongation at Break (percent) | Deformation (percent) | Percent Load Change |
| 11 | 3.7 | 720 | 5.0 | 669 | 133 | 4 |
| G* | 6.4 | 423 | 7.7 | 382 | 137 | 25 |

In fibers prepared from both polymer example 11 and comparative G, crosslinking results in an increase in tenacity with some loss of elongation. Both examples show similar permanent deformation of approximately 135 percent. Example 11 displays lower stress relaxation than comparative G as well as being less temperature sensitive. The percent load change between 40° C. (35 min) and 21° C. (35 min) are listed in Table 9. The fiber prepared from Example 11 polymer shows only 4 percent change in load whereas the fiber of Comparative G displays 25 percent change. Low temperature sensitivity in stress relaxation is important in maintaining long shelf life of fiber bobbins. High temperature sensitivity in stress relaxation can lead to bobbin defects during storage in a non-climate controlled storage facility as the fiber alternately relaxes and constricts due to temperature fluctuations. This can lead to problems such as poor fiber unwinding behavior and fiber breaks in subsequent downstream processing of the fiber.

Fiber Production

Monofilament fibers of 40 denier are melt spun into 100 to 300 g bobbins using inventive Ex. 19A and Ex. 19B, and comparative Ex. 19K (Dow AFFINITY® EG8100) with a 2.7×0.9 mm round spinneret. With density and melt index similar to Ex. 19A and Ex. 19B, Ex. 19K is an ethylene-octene copolymer with 0.870 g/cc density as determined by ASTM D-792 and 1 MI as determined according to ASTM D-1238, Condition 190° C./2.16 kg. Spinning temperatures range from 280° C. to 290° C. for Ex. 19A and Ex. 19B. Ex. 19K is spun at 290° C. and 300° C. only due to excessive fiber breakage when spun at a lower temperature. Between the spinneret and the takeup roller, there is a cold air quench chamber with 2 m in length for solidifying the fiber. A silicone based spin finish of Lurol 8517 (Goulston Technologies) is applied at 2 wt % to the surface of the fiber via a spin finish applicator after the fiber had solidified from the melt. Afterwards, the fiber is wound into a bobbin with speeds ranged from 400 to 600 m/min. The spinning temperature and winding speeds are processing variables used to tailor the tensile response of the resulting fiber. Prior to spinning, resins from each of the examples are compounded with 3000 ppm of Cyanox 1790 (Cytec Industries) and 3000 ppm of Chimasorb 944 (Ciba Specialty Chemicals) as antioxidants.

Example 1

Mechanical Properties

The tensile behaviors of fibers spun from Ex. 19A, Ex. 19B, and Ex. 19K. are measured based on BISFA Test Methods for Bare Elastic Yarns, Chapter 6: Tensile Properties Option A. F Fibers are tested at 500 mm/min with 100 mm gauge length. Pneumatic clamps are used (Model 2712-001, Instron Corp.). Tenacity, elongation at break, and load at 300% elongation are reported from an average of 5 replicates.

The recovery behavior of fibers are also measured using BISFA Test Methods for Bare Elastic Yarns, Chapter 7: Viscoelastic Properties Procedure A where the fiber is cyclically loaded to 300% strain. The % permanent deformation is calculated after the 1$^{st}$ and 5$^{th}$ cycle in the loading curve as specified in the test method. As comparison, a commercial crosslinked 40 denier Dow XLA® Fiber is also measured for tensile and recovery behaviors.

Mechanical properties of fibers spun from Ex. 19A, Ex. 19B, comparative Ex. 19K, and comparative Ex 19L which is a commercial product of 40 denier Dow XLA® fibers are shown in Table 12. The spinning conditions for Ex. 19A, Ex. 19B, and Ex. 19K are chosen such that the elongation at break is comparable to the commercial product in Ex. 19L. The data show that Ex 19A and Ex. 19B needs to be spun at lower temperatures and higher speeds than Ex. 19K and Ex. 19L in order to achieve similar elongation at break. This suggests that one can potentially increase production throughput when using the inventive examples.

Often, higher tension is desired for downstream fiber processing. In applications where fiber is unwound positively (unwind under constant draw ratio), the line tension can drop as the fiber passes through various guides and elements due to friction. Fiber can break in the machine if the line tension is dropped too low. Table 12 shows that Ex. 19A and Ex 19B had higher loads that Ex. 19K and Ex. 19L at 300% strain while maintaining similar elongation at break. In particular, Ex. 19A exhibits significantly higher load at 300% (10.2 g for Ex. 19A versus 7.0 g for Ex. 19L)

For elastic fibers, high degree of recovery is preferred after stretching. Both Ex 19A and Ex 19B show lower permanent set (higher recovery) than comparative Ex 19K. and Ex. 19L, with Ex. 19B showing significantly lower permanent set (48% after 5 cycles for Ex 19B. versus 117% for Ex. 19L).

For some of the elastic fibers according to embodiments of the invention, inventive block interpolymers having a higher Mw/Mn, e.g., greater than about 2.5, and as high as about 5, preferably as high as about 4, are preferred for lower permanent set than fibers made from inventive block interpolymers having Mw/Mn less than about 2.5. The permanent set at 300% elongation after one hysteresis cycle of these fibers made from the higher Mw/Mn polymers is no more than 60%, preferably no more than about 50%, more preferably, no more than about 40%, and can be as low as 0%. It was observed that, diethyl zinc, used as the shuttling agent, correlates with Mw/Mn, such that higher diethyl zinc levels used to polymerize the multi-block polymers results in narrower Mw/Mn and higher permanent set.

Example 2

Dynamic Friction with Ceramic and Metal Pins

Figure 8:
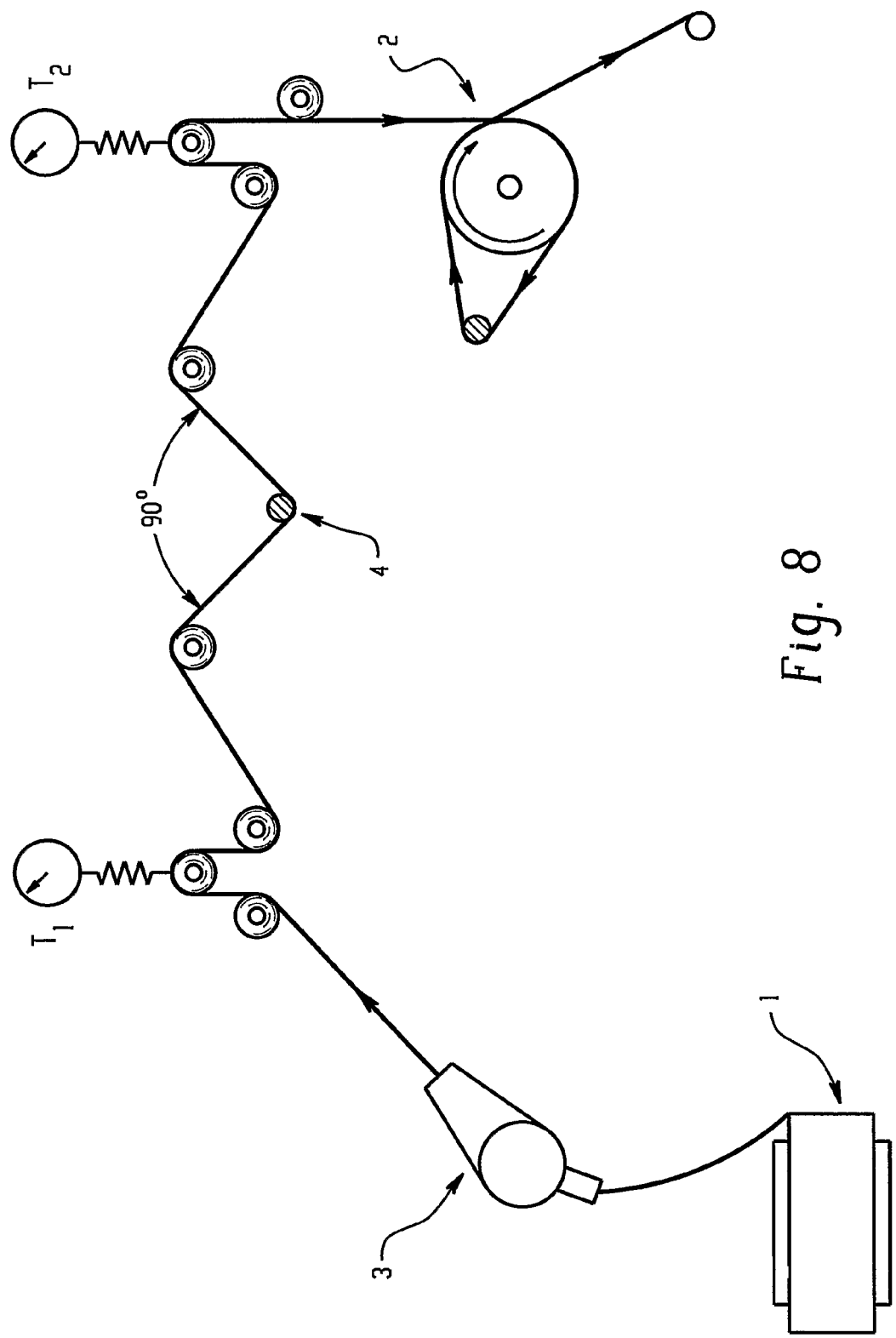
FIG. 8 is a schematic of the apparatus for measuring dynamic friction coefficients.

Frictional property is measured using, Electronic Constant Tension Transporter, or ECTT (Lawson Hemphill). A schematic of the setup is shown in FIG. 8. The ECTT consists of a feed roll (1) and a take-up roll (2) controlled independently by a computer (not shown). Fiber is fed at constant tension using a feeder attachment (3) (Model KTF100HP, BTSR) and it is wound up at the other end at 100 m/min. Tensions before and after a friction pin (4) are measured with two 25 cN load cell (Perma Tens 100p/100cN, Rothschild). Between the load cells, the fiber passes across a 6.4 mm diameter friction pin at 90° wrap angle. Two different friction pins are used to simulate the range of surfaces a fiber can encounter during post-spinning processing. The first type is a ceramic pin (R.250S P2, Heany Industries) with a surface roughness of 0.32 μm Ra. The second type of pin is considerably smoother with Ra of 0.14 μm made from nickel plated polished steel. The fiction coefficient can be calculated using the Euler formula:

$$\frac{T_2}{T_1} = e^{\mu\theta}$$

where μ is the friction coefficient, $T_2$ is the tension after the pin, $T_1$ is the tension before the pin, and θ is the wrap angle (π/2).

Dynamic coefficient of friction (COF) results are listed in Table 13. The data show that inventive Ex. 19A. and Ex. 19B have lower friction than Ex. 19K and Ex. 19L in ceramic and steel pins. Having low COF is desirable because high friction can often lead to fiber breaks in weaving and knitting applications For some preferred fibers of the invention, the COF with polished metal can be relatively low, as low as about 1.15 and less, preferably 1.1 or less, more preferably 1 or less, and as low as about 0.8. The date of Table 13 shows that fibers of the invention have lower COF than comparative fibers, even though all of the fibers have the same amount and type of spin finish.

Example 3

Crosslinking

After spinning, fibers are packaged under nitrogen and crosslinked through electron beaming (e-beam) to impart high temperature resistance. Spun fibers are irradiated with dosage of 192 KGy using a series of 6 passes through the e-beam line (Ionmed, Spain) with a dosage of 32 KGy for each pass. Between each pass, the fibers are cooled to −10° C. due to heating during the e-beam process.

Dynamic mechanical spectroscopy (DMS) is performed on an RSA III extensional rheometer (TA instruments) to measure heat resistance. A bundle of 60-40-denier fibers is clamped between at both ends between fixtures separated by 10 mm. The sample is then subjected to successive temperature steps from 25° C. to 200° C. at 3° C. per step. At each temperature the storage modulus, E', is measured at a strain frequency of 10 rad/s and a strain amplitude cycling between 0.1% and 5%. An initial static force of 5 g is applied to prevent slack in the sample. The test ends when the temperature reaches 200° C.

Figure 9:
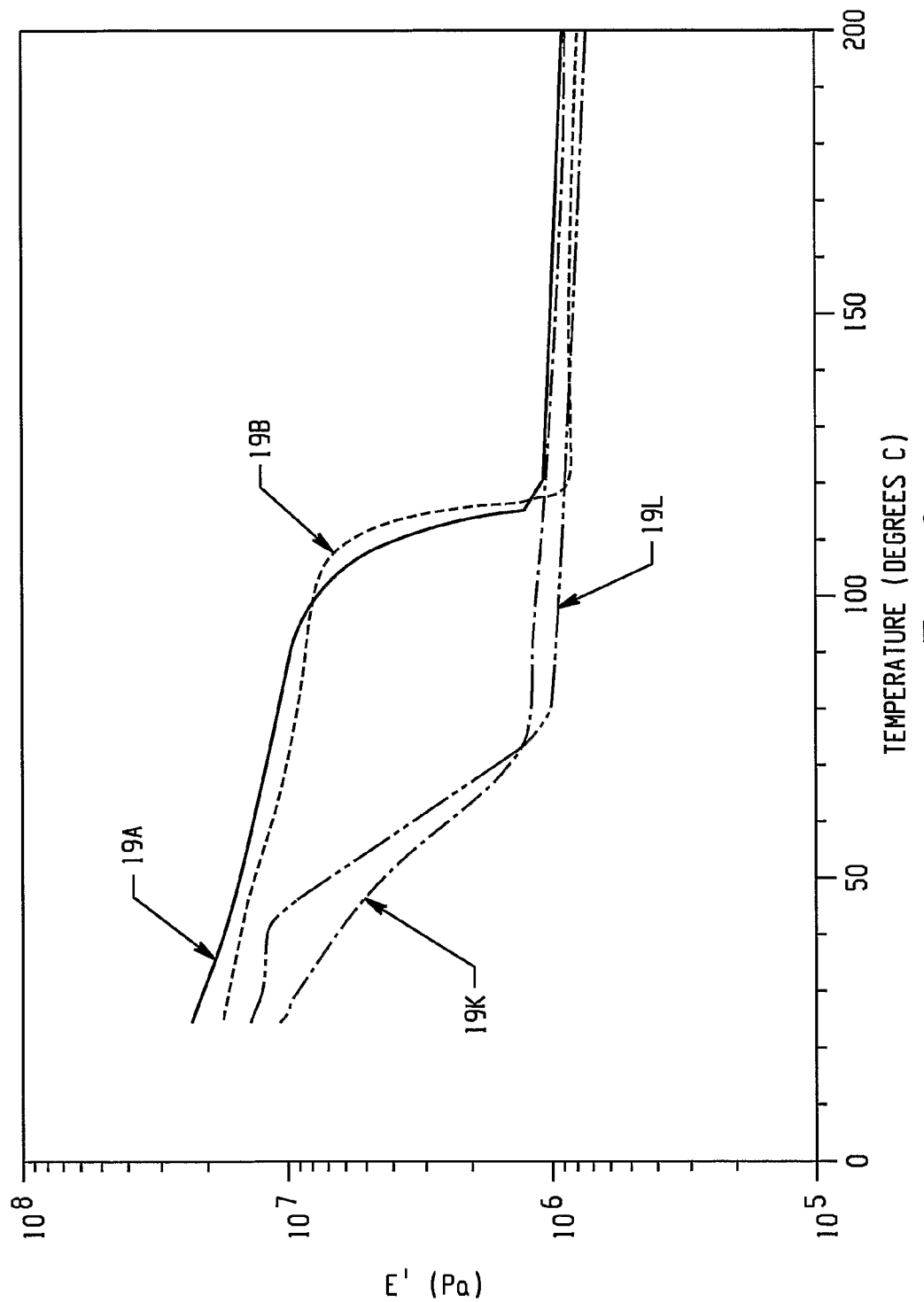
FIG. 9 shows dynamic mechanical thermal response of cross-linked Polymer Example 19A, Example 19B, Example 19K, and Example 19L. The curve labeled "19A" represents Polymer Example 19A; the curve labeled "19B" represents Polymer Example 19B; the curve labeled "19K" represents a Dow AFFINITY® EG8100 resin; and the curve labeled "19L" represents a commercial product of 40 denier Dow XLA® fibers.

FIG. 9 shows the dynamic mechanical thermal response of crosslinked Ex. 19A, Ex 19B, Ex 19K and Ex 19L. The plot shows that Ex. 19A and Ex 19B have 10 times higher modulus than Ex 19L between 75° C. and 110° C. The storage modulus ratio of E'(25° C.)/E'(100° C.) are listed in Table 14. The fibers from inventive polymers have a storage modulus ratio of 3 or less, whereas comparative examples have a storage modulus ratio of 10 and above. It is desirable that the storage modulus ratio of the fiber be as close to 1 as possible. Such fibers will be relatively less affected by temperature and can provide performance advantages such as improved tolerance to heat during storage and e-beaming.

Example 4

Unwind Behavior

Figure 10:
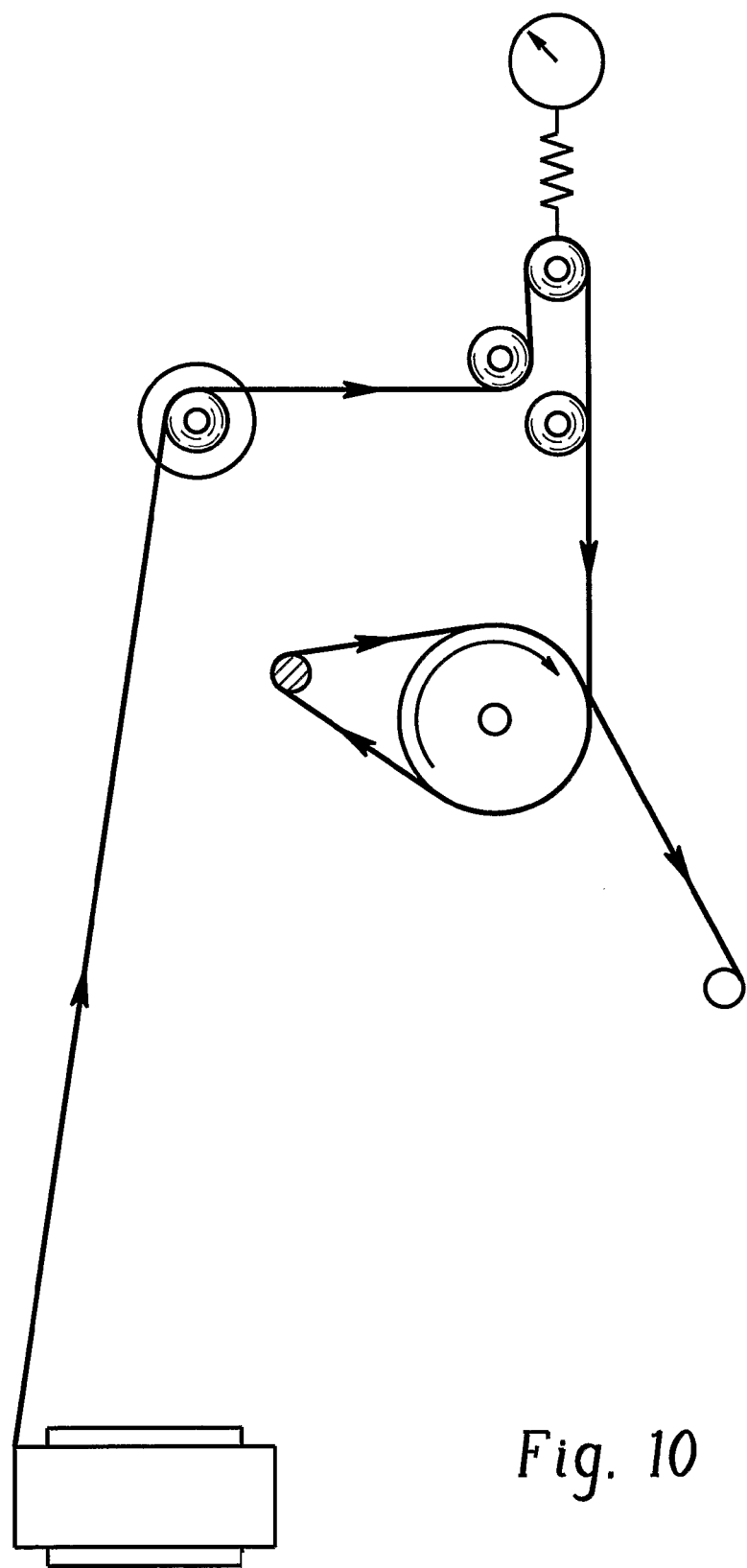
FIG. 10 is a schematic of end-on unwind tension setup.

An important performance property for elastic fibers is that the fiber needs to be unwound from the bobbin smoothly and without breaks. The unwind tension, its variation, and gradients of tension within the bobbin can be used to infer bobbin unwinding performance in yarn and textile unit operations. The ECTT is used to measure end-on unwind tension at 200 m/min takeup speed, as shown in FIG. 10. Data are gathered for a period of 5 minutes with the last 3 minutes of the scan used to obtain the mean and the standard deviation of unwind tension. Bobbins of 300 g are used for the test with 2 storage conditions. They are either stored at 21° C. about 1 day after spinning or stored in an oven at 40° C. for 12 hours to simulate accelerated aging. Unwind tension measurements are taken at 3 positions of the spool: surface, 0.5 cm where about half the fibers are stripped off, and 0.5 cm, where most of the fibers re stripped off.

Figure 11A:
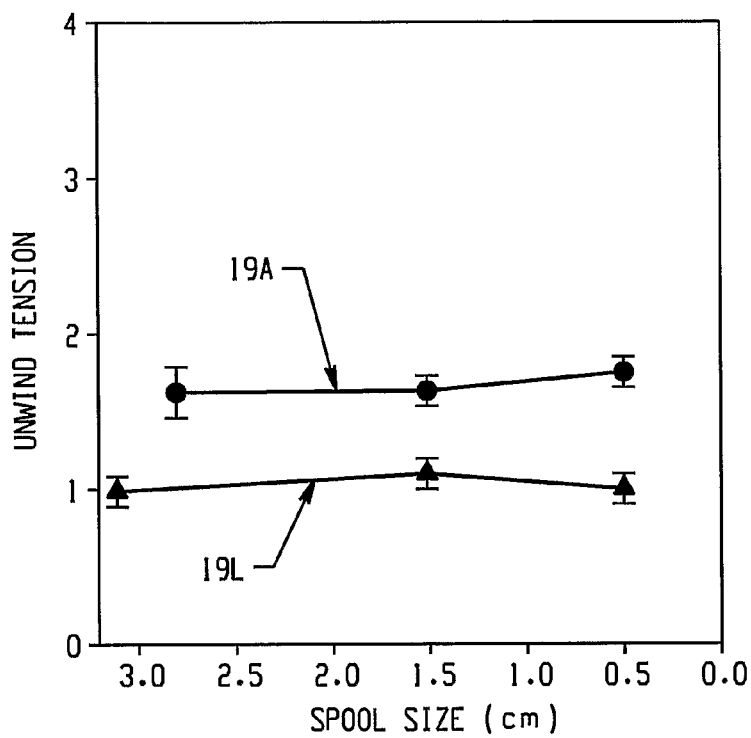
FIG. 11 shows end-on unwind behavior of fibers from inventive and comparative examples after: a) storage at 21° C.
Figure 11B:
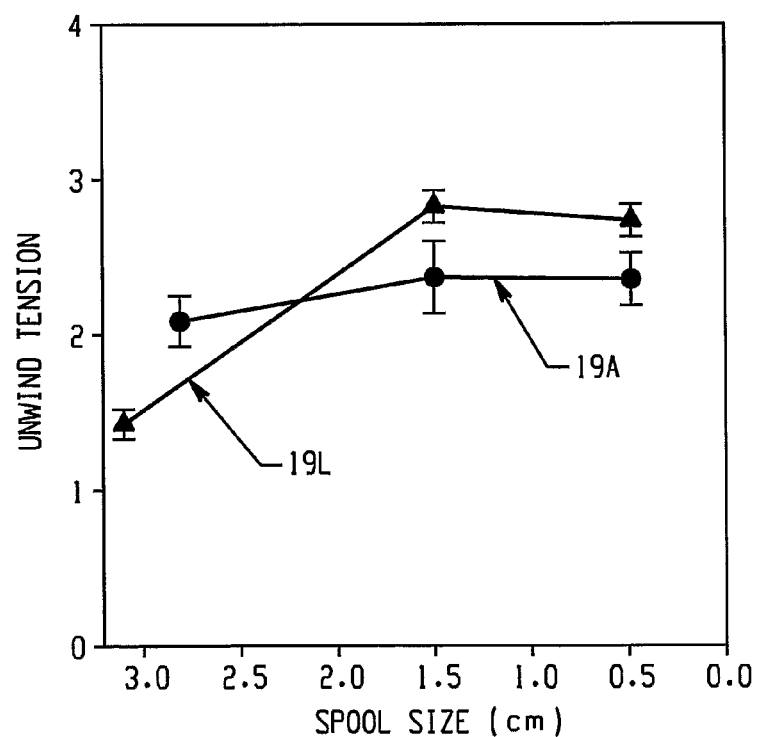

The results are shown in FIG. 11, where the unwind tension is plotted against spool size. FIG. 11a shows that storage at 21° C. shows that both Ex. 19A and Ex 19L have unwind tensions relatively constant with spool size, with Ex. 19A showing higher tension at about 1.6 g versus about 1.0 g for Ex. 19L. After subject to storage at 40° C. for 12 hours, the unwind tension for both examples increase but to a greater extent for Ex. 19L (FIG. 11b). The unwind tension for Ex 19A is relatively constant with spool size at 2.0 to 2.3 g. For Ex. 19L, the surface had an unwind tension of 1.4 g at the surface and increases significantly to almost 3.0 g at 1.5 cm spool size. Because of the higher melting temperature in the inventive example, the unwind performance is less temperature sensitive during storage and can potentially have longer shelf life than the comparative example.

TABLE 12

Mechanical properties of fibers

| Example | Spinning Conditions | | Elongation at Break (%) | | Tenacity (g/denier) | | Load at 300% (g) | | Permanent Set (%) | |
|---|---|---|---|---|---|---|---|---|---|---|
| | Temp. (° C.) | Speed (m/min) | Average | Std Dev | Average | Std Dev | Average | Std Dev | 1 Cycle | 5 Cycles |
| 19A | 290 | 500 | 534 | 22 | 1.0 | 0.1 | 10.2 | 0.2 | 64 | 93 |
| 19B | 280 | 500 | 540 | 10 | 1.0 | 0.0 | 8.3 | 0.4 | 38 | 48 |
| 19K | 300 | 400 | 536 | 10 | 1.2 | 0.1 | 6.3 | 0.0 | 89 | 103 |
| 19L | 300 | 450 | 528 | 16 | 1.3 | 0.2 | 7.0 | 0.2 | 102 | 117 |

TABLE 13

Dynamic friction coefficients

| | COF | |
|---|---|---|
| Example | Ceramic | Metal |
| 19A | 0.63 | 1.09 |
| 19B | 0.62 | 1.01 |
| 19K | 0.81 | 1.21 |
| 19L | 0.73 | 1.28 |

TABLE 14

Storage modulus ratios E'(25° C.)/E'(100° C.)

| Example | E'(25° C.)/E'(100° C.) |
|---|---|
| 19A | 3 |
| 19B | 2 |
| 19K | 10 |
| 19L | 14 |

Nonwoven Fabrics

The resins listed in the table below are used in following examples.

| Ex. | Resin | Grade | Melt Flow | Density, g/cc | Note |
|---|---|---|---|---|---|
| 19C | Inventive polymer | | 5 MI | 0.877 | |
| 19E | Inventive polymer | | 5 MI | 0.877 | |
| 19D | Inventive polymer | | 5 MI | 0.877 | |
| 19J | Inventive polymer | | 5.5 MI | 0.900 | |
| 19I | Inventive polymer | | 10 MI | 0.877 | |
| 19M | AFFINITY ® | EG8200G | 5 MI | 0.870 | |
| 19N | AFFINITY ® | | 10 MI | 0.870 | |

-continued

| Ex. | Resin | Grade | Melt Flow | Density, g/cc | Note |
|---|---|---|---|---|---|
| 19O | VERSIFY ® | DE4300 | 25 MFR | 0.8665 | equiv. to 8.3 MI* |
| 19P | VERSIFY ® | DE3300 | 8 MFR | 0.8665 | equiv. to 2.7 MI* |

Spinning Conditions

Fiber samples are prepared by using the Hills Bicomponent Fiber Line. The fiber spinning line consists of two 1" single screw extruders, two Zenith gear pumps, a 144-hole spinneret with a blocking plate which reduced the available holes to 72, a fiber quenching cabinet, and a wind-up station. The capillary hole of the spinneret is 0.65 m in diameter with L/D ratio=3.85:1. The melt temperature is set to 245° C. The throughput is 0.6 grams per hole per minute (ghm). Fibers are spun by using two different methods, air drawing, and mechanical drawing by using a winder to collect fiber packages for property testing.

Determination of Stickpoint

"Stickpoint" is defined as the point in the spinline at which the fiber is solid enough not to stick to an object. Stick points are usually measured by stringing up the fiber at fixed speeds (e.g., 1000, 2000, 3000 m/min), and then pressing a glass rod against the front of the fiber bundle at the bottom of the quench cabinet. The glass rod is slowly raised until the fiber sticks to the rod. The distance from the spinneret to the point in the cabinet where the glass rod stuck to the fibers is recorded as the stickpoint. This measurement is repeated 3 times at each spinning speed and the stick points are averaged. When measuring the stick point or collecting the monocomponent elastic fibers, only the A-side extruder was used for extruding fibers Aspirator/Moving Screen Setup for Roping Study FIG. 12 is a schematic representation of a setup to simulate conditions in a spunbond line in which roping could occur. It is an aspirator (3)/moving screen (4) setup constructed to air draw fibers (1A) through the aspirator (3). The fibers (1B) after passing through the aspirator (3) form a fiber web (2). This setup uses an aspirator (3) (Air Amplifier, model ITW Vortex 912/952 by Transvector Incorporation) with 1.625 inch diameter opening. It is located at 60 inches (about 150 cm) below the die face (not shown) from which fibers (1B) exit. It also allows the aspirator (3) to be below the predicted stick point of the spinning line (estimated to be about 35 inches for the target denier). An inlet pressure of 100 psi for a 0.3 ghm throughput is used.

A manually moving screen and rack system (4) about 10 inches under the aspirator (3) is installed to continuously collect fiber webs (2). This is intended to simulate a wire or web former. In the aspirator (3), the confined space and air turbulence are thought to generate a high probability of fiber-fiber contacts. It is assumed that this gives the opportunity for fibers to block. Fibers (1B) that collide and do not have significant adhesion have the opportunity to separate upon deceleration at the aspirator exit. In contrast, an adhesive bond of sufficient strength may propagate as fiber is drawn through the aspirator (3). This is thought to produce a continuous bond along the fiber axis resulting in the structure known as a rope.

100% Hysteresis Test for Determining Immediate Set and Retained Load

The fiber strand comprising 72 filaments is prepared and gripped in the Instron with 3" gauge length. The crosshead speed is set at 10 inches per minute. The crosshead is raised until a strain of 100% is applied, and then the crosshead is returned at the same crosshead speed to 0% strain. After returning to 0% strain, the crosshead is extended at 10 inches per minute to 100% strain as calculated for the original 3 inch length. The onset of load was taken as the immediate set.

Reduced load is measured during the first extension and first retraction of the sample at 30% strain. Retained load is calculated as the reduced load at 30% strain during the first retraction divided by the reduced load at 30% strain during the first extension and then multiplied by 100.

Stickpoint Measurement

Stickpoint represents the melt freezing point formed under stress-induced/enhanced crystallization during drawing. Lower stickpoint (closer to the die) is desired to avoid roping.

TABLE 15

Stickpoints for Various Fibers

| Ex | Stickpoint, cm |
|---|---|
| 19I | 42 |
| 19N | 53 |
| 19O | 62 |

TABLE 16

Visual Ranking of Comparable Web Formations

| Samples | Visual Web Formation Ranking |
|---|---|
| 19I | A |
| 19N | C |
| 19O | B |

In the visual ranking test on web formations, A is the best with least roping, while C is the worst with most roping. FIG. 13 is a photo of the three web for Ex. 19I, Ex 19N, Ex 19O.

Thus, non-woven fabrics comprising fibers made from the inventive block copolymers or interpolymers will have less degree of roping than non-woven fabrics (e.g., spunbond or melt blown) made from fibers comprising a similar random copolymer. By similar, it is meant that the melt index, and density are within 10% of each other, and that each copolymer comprises the same monomers. By improved roping, it is meant that there are a minimal number of filament/fiber aggregates (bundles). To quantify a fabric with good formation (i.e., minimal roping), the number of filament aggregates per 2 cm length is measured. Each filament aggregate is at least 10 times the fiber width in length. Care is taken not to include thermal and pressure bond points in the 2 cm length. Over a 2 cm length in random directions, the linear line count of filament aggregates is taken. Filament aggregates consist of multiple filaments in parallel orientation fused together. The filaments are fused for greater than 10 times the width of the fiber. Filament aggregates are separate from thermal or pressure bond points. For good web formation, the number of filament aggregates is lower than 30/2 cm, preferentially lower than 20/2 cm., and can be as low as about ⅝ cm, preferably as low as about ½ cm, especially as low as 0/2 cm (i.e., rope free).

Immediate Set and Retained Load

FIG. 14 shows that the fibers made in accordance with embodiments of the invention can also exhibit low immediate set, after testing at one hysteresis cycle at 100% strain. The immediate set can be as low as 20%, preferably as low as about 10% and can be as low as 0% immediate set, especially for fibers made from inventive block copolymers or interpolymers having densities of about 0.9 g/cm$^3$ or less, preferably about 0.895 g/cm$^3$ or less, more preferably 0.89 g/cm$^3$ or less, and can be as low as about 0.85 g/cm$^3$.

It is seen from FIG. 15 that fibers made from inventive polymers have lower immediate set than AFFINITY® and VERSITY® fibers. Higher density fiber shows higher immediate set, as expected. At 60% strain, inventive fibers show higher retained load than AFFINITY® and VERSITY® as demonstrated in FIG. 15 and Table 17. This is because inventive fibers have lower extension forces.

TABLE 17

Immediate Set and Retained Load for Comparable Fibers

| Ex | Resins | Spinning Speed, m/min | Immediate Set, % | Retained Load, % |
|---|---|---|---|---|
| 19C | Inventive Polymer | 750 | 8 | 14.6 |
| 19C | Inventive Polymer | 1000 | 10 | 12.1 |
| 19E | Inventive Polymer | 750 | 12 | 13.5 |
| 19E | Inventive Polymer | 1000 | 17 | 12.1 |
| 19D | Inventive Polymer | 750 | 15 | 10.7 |
| 19D | Inventive Polymer | 1000 | 20 | 8.1 |
| 19M | AFFINITY ® EG8200G | 750 | 20 | 6.0 |
| 19M | AFFINITY ® EG8200G | 1000 | 23.2 | 5.4 |
| 19P | VERSITY ® DE3300 | 750 | 21 | 6.1 |
| 19P | VERSITY ® DE3300 | 1000 | 26 | 5.5 |

As demonstrated above, embodiments of the invention provide fibers made from unique multi-block copolymers of ethylene and α-olefin. The fibers may have one or more of the following advantages: good abrasion resistance; low coefficient of friction; high upper service temperature; high recovery/retractive force; low stress relaxation (high and low temperatures); soft stretch; high elongation at break; inert: chemical resistance; UV resistance. The fibers can be melt spun at a relatively high spin rate and lower temperature. The fibers can be crosslinked by electron beam or other irradiation methods. In addition, the fibers are less sticky, resulting in better unwind performance and better shelf life, and are substantially free of roping (i.e., fiber bundling). Because the fibers can be spun at a higher spin rate, the fibers' production throughput is high. Such fibers also have broad formation windows and broad processing windows. Other advantages and characteristics are apparent to those skilled in the art.

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. While some embodiments are described as comprising "at least" one component or step, other embodiments may include one and only such component or step. Variations and modifications from the described embodiments exist. The method of making the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A fiber obtainable from or comprising at least one ethylene/α-olefin interpolymer, wherein the ethylene/α-olefin interpolymer is a block copolymer comprising at least 50 mole percent ethylene and is characterized by one or more of the following properties:
   (a) a Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -2002.9 + 4538.5(d) - 2422.2(d)^2; \text{ or}$$

(b) a Mw/Mn from about 1.7 to about 3.5, and a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° C. \text{ for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) an elastic recovery, Re, in percent at 300 percent strain and 1 cycle measured with a compression-molded film of the ethylene/α-olefin interpolymer, and a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

(d) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer comprises the same comonomer(s) and has a melt index, density, and molar comonomer content (based on the whole polymer) within 10 percent of that of the ethylene/α-olefin interpolymer, wherein the fiber is cross-linked.

2. The fiber of claim 1, wherein the ethylene/α-olefin interpolymer is characterized by an elastic recovery, Re, in percent at 300 percent strain and 1 cycle measured from a compression-molded film of the ethylene/α-olefin interpolymer and a density, d, in grams/cubic centimeter, wherein the elastic recovery and the density satisfy the following relationship when the ethylene/α-olefin interpolymer is substantially free of a cross-linked phase:

$$R_e > 1481 - 1629(d).$$

3. The fiber of claim 1, wherein the ethylene/α-olefin interpolymer has at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2$$

and wherein the interpolymer has a $M_w/M_n$ from about 1.7 to about 3.5.

4. The fiber of claim 1, wherein the ethylene/α-olefin interpolymer has a $M_w/M_n$, from about 1.7 to about 3.5, and the interpolymer is characterized by a heat of fusion, ΔH, in J/g, and a delta quantity, ΔT, in degree Celsius defined as the difference between the tallest DSC peak minus the tallest CRYSTAF peak, the ΔT and ΔH meet the following relationships:

$$\Delta T > -0.1299(\Delta H) + 62.81, \text{ for } \Delta H \text{ greater than zero and up to 130 J/g, or}$$

$$\Delta T \geq 48° C., \text{ for } \Delta H \text{ greater than 130 J/g },$$

wherein the CRYSTAF peak is determined using at least 5 percent of the cumulative polymer, and if less than 5 percent of the polymer has an identifiable CRYSTAF peak, then the CRYSTAF temperature is 30° C.

5. A fiber obtainable from or comprising at least one ethylene/α-olefin interpolymer, wherein the ethylene/α-olefin interpolymer is a block copolymer comprising at least 50 mole percent ethylene and is characterized by one or more of the following properties: (a) having at least one molecular fraction which elutes between 40° C. and 130° C. when fractionated using TREF, characterized in that the fraction has a block index of at least 0.5 and up to about 1 and a molecular weight distribution, $M_w/M_n$, greater than about 1.3; or (b) an average block index greater than zero and up to about 1.0 and a molecular weight distribution, $M_w/M_n$, greater than about 1.3.

6. The fiber of claim 1 wherein the α-olefin is styrene, propylene, 1-butene, 1-hexene, 1-octene, 4-methyl-1-pentene, 1-decene, or a combination thereof.

7. The fiber of claim 1 wherein the ethylene/α-olefin interpolymer is blended with another polymer.

8. The fiber of claim 1 wherein the fiber is a bicomponent fiber.

9. The fiber of claim 1, wherein the percent of cross-linked polymer is at least 20 percent as measured by the weight percent of gels formed.

10. The fiber of claim 1 wherein the fiber has coefficient of friction of less than about 1.2, wherein the interpolymer is not mixed with any filler.

11. A fabric comprising the fiber of claim 1.

12. The fabric of claim 11, wherein the fabric is a nonwoven sheet comprising fibers made by solution spinning.

13. The fabric of claim 11, wherein the fabric is elastic.

14. The fabric of claim 11, wherein the fabric is woven.

15. The fabric of claim 11, wherein the fabric has an MD percent recovery of at least 50 percent at 100 percent strain.

16. A yarn comprising the fiber of claim 1.

17. The yarn of claim 16, wherein the yarn is covered.

18. The yarn of claim 17, where the yarn is covered by cotton yarns or nylon yarns.

19. A method of making a fiber or fabric, comprising:
melting an ethylene/α-olefin interpolymer; and
extruding the ethylene/α-olefin interpolymer into a fiber,
wherein the ethylene/α-olefin interpolymer is a block copolymer comprising at least 50 mole percent ethylene and is characterized by one or more of the following properties:
- (a) a $M_w/M_n$ from about 1.7 to about 3.5, at least one melting point, $T_m$, in degrees Celsius, and a density, d, in grams/cubic centimeter, wherein the numerical values of $T_m$ and d correspond to the relationship:

$$T_m \geq 858.91 - 1825.3(d) + 1112.8(d)^2; \text{ or}$$

- (b) a $M_w/M_n$ from about 1.7 to about 3.5, and a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or
- (c) an elastic recovery, Re, in percent at 300 percent strain and 1 cycle measured with a compression-molded film of the ethylene/α-olefin interpolymer, and a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

- (d) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer comprises the same comonomer(s) and has a melt index, density, and molar comonomer content (based on the whole polymer) within 10 percent of that of the ethylene/α-olefin interpolymer.

20. The method of claim 19, further comprising forming a fabric from the fiber, wherein the fabric is substantially free of roping.

21. A soft polymeric flash-spun plexifilamentary material comprising at least one ethylene/α-olefin interpolymer, wherein the ethylene/α-olefin interpolymer is characterized by one or more of the following properties:
- (a) a $M_w/M_n$, from about 1.7 to about 3.5, at least one melting point, $T_m$, in degrees Celsius, and a density, d, in grams/cubic centimeter, wherein the numerical values of $T_m$ and d correspond to the relationship:

$$T_m > -2002.9 + 4538.5(d) - 2422.2(d)^2; \text{ or}$$

- (b) a Mw/Mn from about 1.7 to about 3.5, and a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or
- (c) an elastic recovery, Re, in percent at 300 percent strain and 1 cycle measured with a compression-molded film of the ethylene α-olefin interpolymer, and a density, d, in grams/cubic centimeter, wherein the numerical values of Re and d satisfy the following relationship when the ethylene/α-olefin interpolymer is substantially free of a cross-linked phase:

$$Re > 1481 - 1629(d); \text{ or}$$

- (d) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer comprises the same comonomer(s) and has a melt index, density, and molar comonomer content (based on the whole polymer) within 10 percent of that of the ethylene/α-olefin interpolymer.

22. The polymeric flash-spun plexifilamentary material of claim 21 wherein the ethylene/α-olefin interpolymer has a density of from about 0.85 g/cc to about 0.95 g/cc and a melt index of from about 0.1 g/10 min to about 50 g/10 min.

\* \* \* \* \*